United States Patent
Taylor et al.

(10) Patent No.: US 12,187,439 B2
(45) Date of Patent: Jan. 7, 2025

(54) APPARATUS AND METHOD FOR AIRFLOW MODIFICATION IN VEHICLES

(71) Applicant: Pexco Aerospace, Inc., Union Gap, WA (US)

(72) Inventors: Shelby P. Taylor, Yakima, WA (US); Brandon M. Shobe, Richland, WA (US); Christopher E. Howard, Yakima, WA (US)

(73) Assignee: Pexco Aerospace, Inc., Union Gap, WA (US)

( * ) Notice: Subject to any disclaimer, the term of this patent is extended or adjusted under 35 U.S.C. 154(b) by 530 days.

(21) Appl. No.: 17/232,895

(22) Filed: Apr. 16, 2021

(65) Prior Publication Data
US 2022/0041287 A1    Feb. 10, 2022

Related U.S. Application Data

(60) Provisional application No. 63/117,371, filed on Nov. 23, 2020, provisional application No. 63/091,075, filed on Oct. 13, 2020, provisional application No. 63/083,836, filed on Sep. 25, 2020, provisional application No. 63/065,791, filed on Aug. 14, 2020, provisional application No. 63/060,893, filed on Aug. 4, 2020.

(51) Int. Cl.
*B64D 13/00*    (2006.01)

(52) U.S. Cl.
CPC ........ *B64D 13/00* (2013.01); *B64D 2013/003* (2013.01)

(58) Field of Classification Search
CPC .. B64D 13/00; B64D 13/06; B64D 2013/003; B64D 2013/0625

USPC .......................................................... 454/73
See application file for complete search history.

(56) References Cited

U.S. PATENT DOCUMENTS

| 2,056,757 A |   | 10/1936 | Adamcikas |
|---|---|---|---|
| 2,314,850 A | * | 3/1943 | Woelfel .................. F24F 13/06 454/109 |
| 2,755,729 A |   | 7/1956 | Galbraith et al. |

(Continued)

FOREIGN PATENT DOCUMENTS

| AU | 602964 B2 | 11/1990 |
|---|---|---|
| DE | 10008598 B4 | 12/2009 |

(Continued)

OTHER PUBLICATIONS

The International Search Report and The Written Opinion of the International Searching Authority, or The Declaration from corresponding PCT application No. PCT/US2021/044274, mailed Jan. 12, 2022, 18 pages.

(Continued)

*Primary Examiner* — Steven B McAllister
*Assistant Examiner* — Charles R Brawner
(74) *Attorney, Agent, or Firm* — Tucker Ellis LLP

(57) ABSTRACT

Provided is an air-diverter apparatus configured to modify the directional airflow in an aircraft cabin. A nozzle may be provided that includes a body having a longitudinal axis, an inlet configured to be connected to a source of air, a flow passage in communication with the inlet and extending through the body, and an outlet in communication with the flow passage, wherein the outlet is angled relative to the longitudinal axis.

10 Claims, 33 Drawing Sheets

(56) References Cited

U.S. PATENT DOCUMENTS

| | | | | |
|---|---|---|---|---|
| 2004/0029519 | A1* | 2/2004 | Pieper | B64D 13/00 |
| | | | | 454/76 |
| 2008/0112155 | A1* | 5/2008 | Scown | B60Q 3/44 |
| | | | | 362/96 |
| 2011/0240796 | A1* | 10/2011 | Schneider | B64D 13/00 |
| | | | | 29/428 |
| 2013/0286673 | A1* | 10/2013 | Umlauft | B64D 13/06 |
| | | | | 454/73 |
| 2016/0102884 | A1* | 4/2016 | Terai | B60H 1/3428 |
| | | | | 454/335 |
| 2017/0089471 | A1 | 3/2017 | Lucas | |
| 2022/0063814 | A1* | 3/2022 | Vandyke | B64D 13/00 |

FOREIGN PATENT DOCUMENTS

| | | | |
|---|---|---|---|
| DE | 102008044874 | A1 | 3/2010 |
| EP | 2851298 | A1 | 3/2015 |

OTHER PUBLICATIONS

Office Action of corresponding European Application No. 21762212.5, date Jul. 30, 2024, 6 pages.

* cited by examiner

APPARATUS AND METHOD FOR AIRFLOW MODIFICATION IN VEHICLES

FIELD OF INVENTION

The present invention relates generally to airflow modification, and more particularly to an apparatus for modifying airflow in an aircraft cabin.

BACKGROUND

Airborne disease transmission increases in densely packed aircraft cabins due to the aerosolization of infectious agents that disperse widely and remain in the air for varying periods, depending on environmental conditions. Although most modern aircraft cabins are equipped with High-Efficiency Particulate Air (HEPA) filters, the path of exhaled aerosol droplets contributes to the potential for virus spread before reaching the air outlets and passing through the HEPA filters. Passengers seated within close proximity of an infected passenger are at increased risk of airborne pathogen transmission.

SUMMARY OF INVENTION

According to one aspect, a nozzle configured to be positioned in a plate is provided. The nozzle includes a body having a longitudinal axis, an inlet configured to be connected to a source of air, a flow passage in communication with the inlet and extending through the body, and an outlet in communication with the flow passage, wherein the outlet is angled relative to the longitudinal axis.

According to another aspect, a nozzle assembly including a plurality of nozzles is provided. The plurality of nozzles include a first nozzle having the outlet angled in a first outward direction, a second nozzle having the outlet angled in a second outward direction opposite the first direction, and a third nozzle positioned between the first and second nozzles, the third nozzle having the outlet angled in a third direction between the first and second directions.

According to still another aspect, a nozzle assembly is provided that includes a first nozzle configured to be positioned in a plate, the first nozzle having a first body having a longitudinal axis, a first inlet configured to be connected to a source of air, a first flow passage in communication with the first inlet and extending through the first body, and a first outlet in communication with the first flow passage, a second nozzle configured to be positioned in the plate, the second nozzle having a second body having a longitudinal axis, a second inlet configured to be connected to the source of air, a second flow passage in communication with the second inlet and extending through the second body, and a second outlet in communication with the second flow passage, and a third nozzle configured to be positioned in the plate, the third nozzle having a third body free of an outlet to block flow therethrough.

According to yet another aspect, a clip for holding a gasper in an open position is provided, the clip including a body having first and second ends circumferentially spaced from one another to define a gap, a channel formed in the body to abut an edge of the gasper to hold the clip in the gasper, and one or more flow control elements for allowing airflow from the gasper to flow around the clip.

According to a further aspect, a clip for holding a gasper in an open position is provided, the clip including a substantially conical body having a plurality of circumferentially spaced legs, wherein the legs secure the clip to the gasper and wherein gaps are defined between adjacent ones of the legs for allowing airflow from the gasper to flow around the clip.

According to another aspect, a gasper plate configured to attach to a gasper panel having a first gasper, a second gasper, and a third gasper between the first and second gaspers is provided. The gasper plate includes a projecting configured to attach to the third gasper, and first and second cutouts at ends of the plate to hold the first and second gaspers respectively at predetermined angles to direct airflow outward.

According to still another aspect, a gasper assembly is provided that includes an air distributor configured to be coupled to a gasper hose, a gasper panel attached to the air distributor, one or more fasteners attached to the gasper panel for attaching the gasper panel to a passenger service unit, and one or more nozzles.

According to yet another aspect, a gasper assembly is provided that includes an air distributor configured to be coupled to a gasper hose, and a gasper panel attached to the air distributor, the gasper panel including a plurality of nozzles, each nozzle including one or more outlets, wherein at least one nozzle has a respective one of the one or more outlets angled outward relative to an axis of the gasper panel and at least one nozzle has a respective one of the one or more outlets extending parallel to the axis.

According to a further aspect, an air-diverter assembly is provided that includes an inlet cover configured to attach to an air inlet, the inlet cover including first and second legs, a cavity defined between the first and second legs in communication with the air inlet, and a gap between ends of the first and second legs in communication with the cavity, wherein the first leg includes one or more openings extending therethrough in communication with the cavity such that at least some of the air from the cavity exits through the one or more openings, and at least one inlet spacer configured to be coupled to the inlet cover to close the gap between the ends of the first and second legs.

In an embodiment, the air-diverter assembly can include a lateral arm assembly configured to be coupled to the inlet cover, the lateral arm assembly having a flow passage to direct air from the cavity laterally, and one or more openings through which the air from the flow passage flows downward.

The foregoing and other features of the application are described below with reference to the drawings.

DETAILED DESCRIPTION

The principles of the present application relate to modifying airflow in an aircraft cabin and thus will be described below in this context. It will be appreciated that the principles of the application may be applicable to modifying airflow in other vehicles and spaces, such as buses, trains, waiting rooms, etc.

Figure 1:
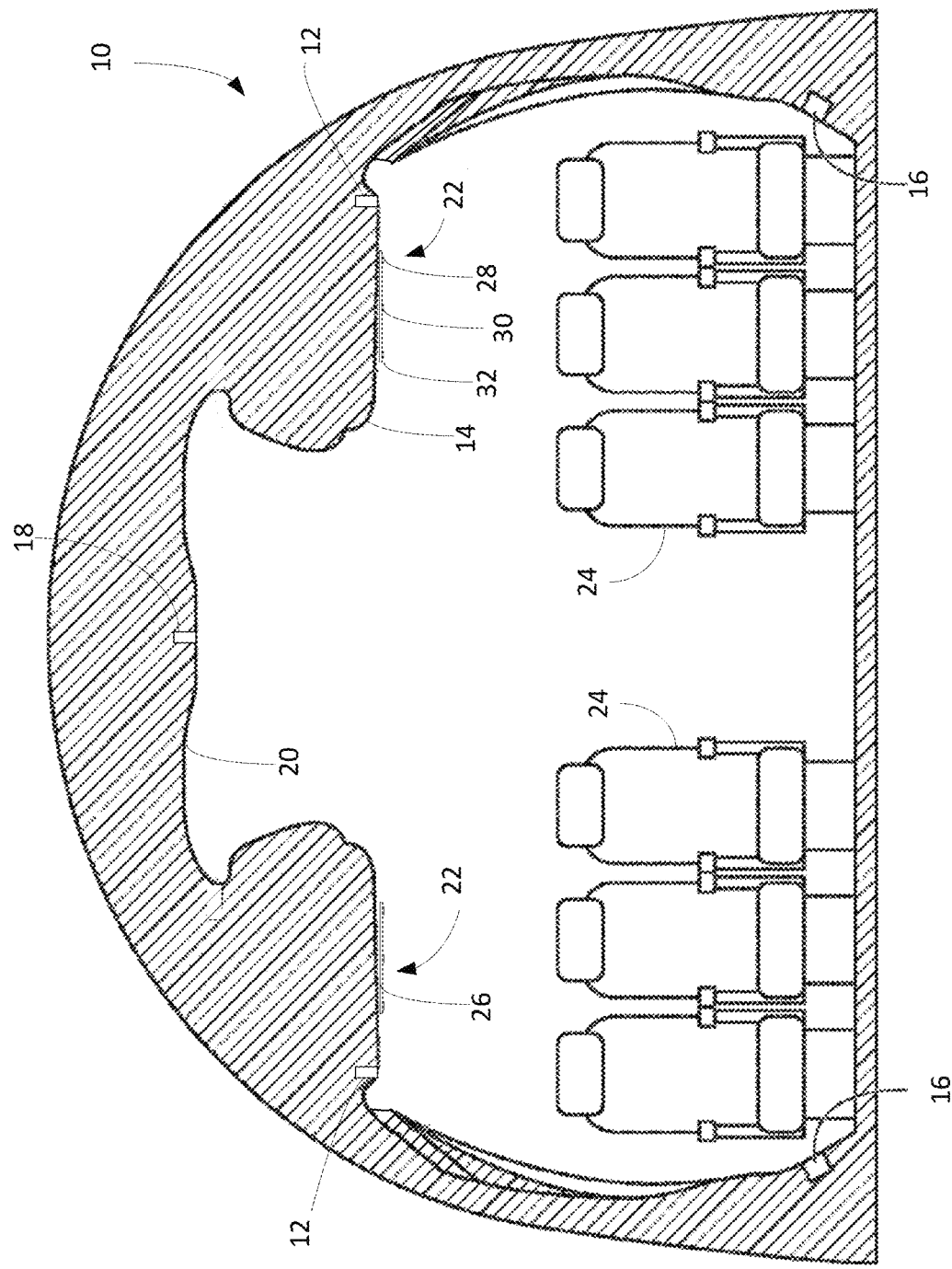
FIG. 1 is a partial cross-section of an aircraft cabin.
Figure 2:
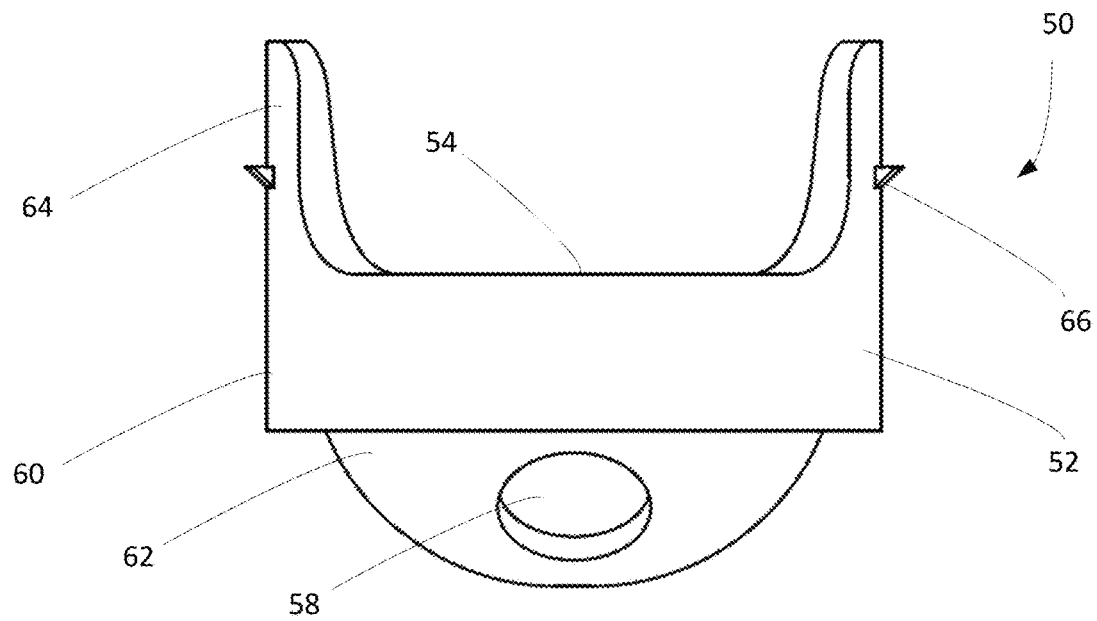
FIG. 2 is a front view of a gasper nozzle.
Figure 3:
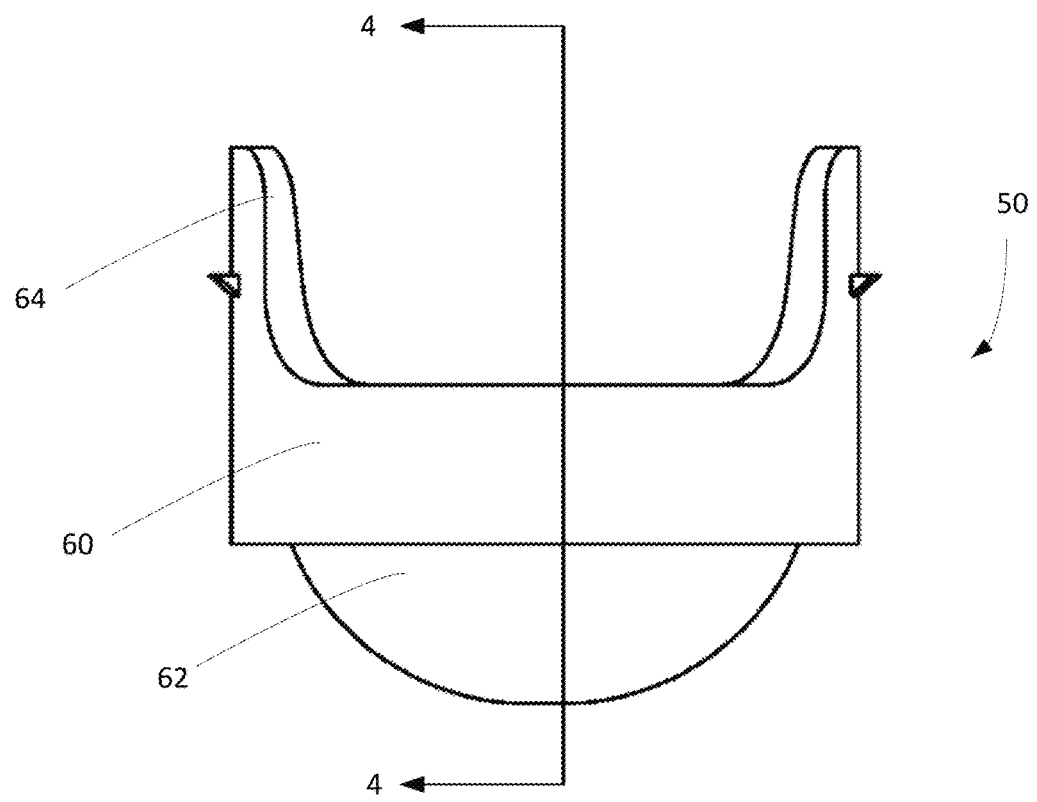
FIG. 3 is a rear view of the gasper nozzle.
Figure 4:
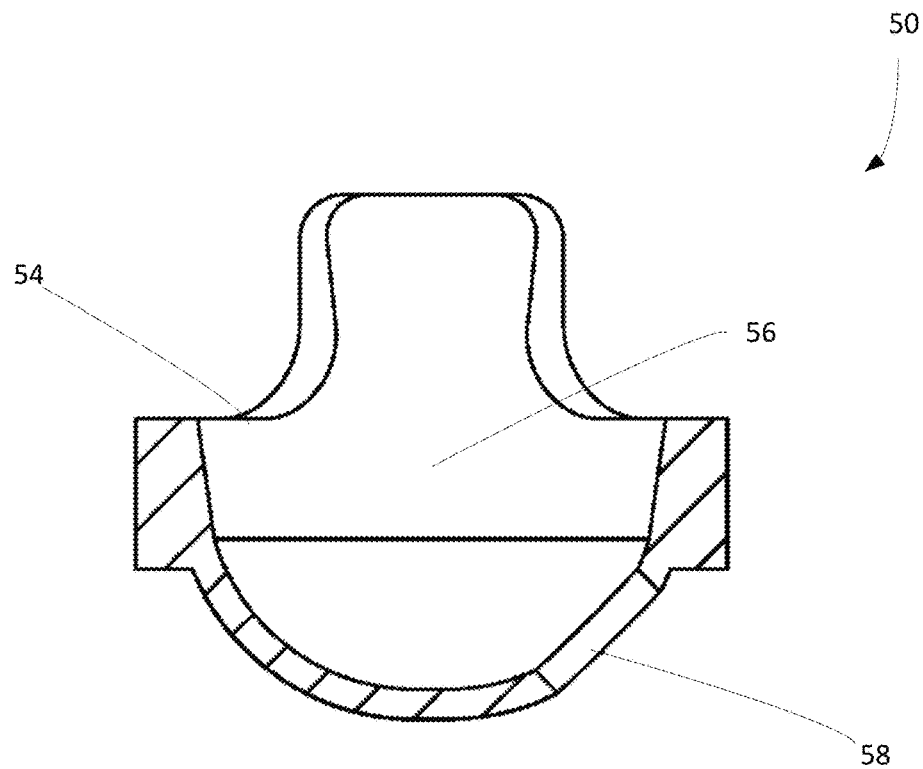
FIG. 4 is a cross-sectional view taken about line 4-4 in FIG. 3.
Figure 5:
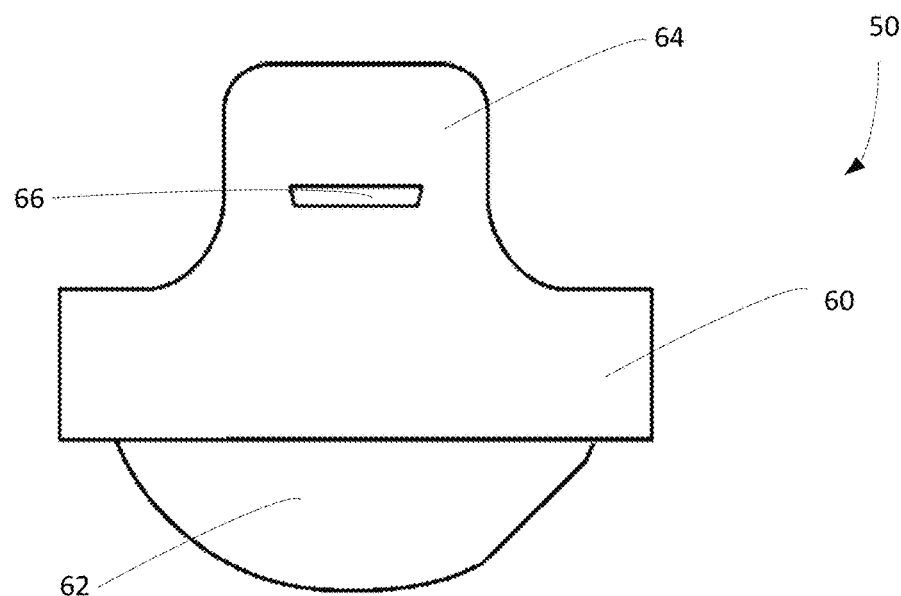
FIG. 5 is a side view of the gasper nozzle.
Figure 6:
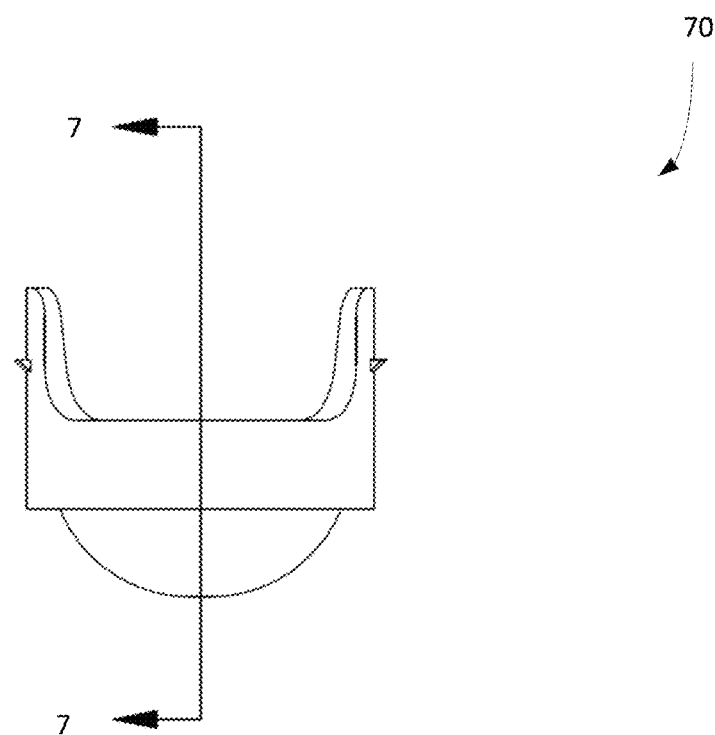
FIG. 6 is a front view of another exemplary gasper nozzle.
Figure 7:
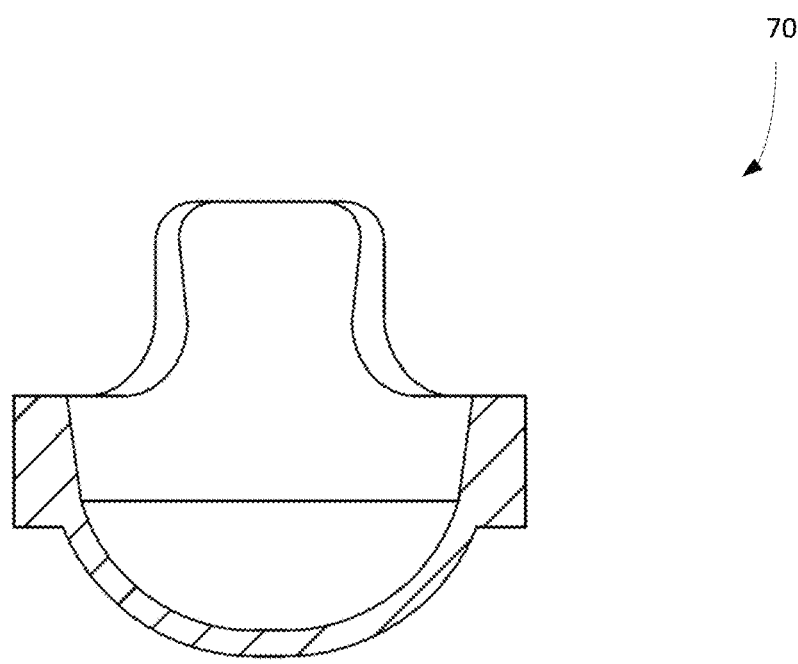
FIG. 7 is a cross-sectional view taken about line 7-7 in FIG. 6.
Figure 8:
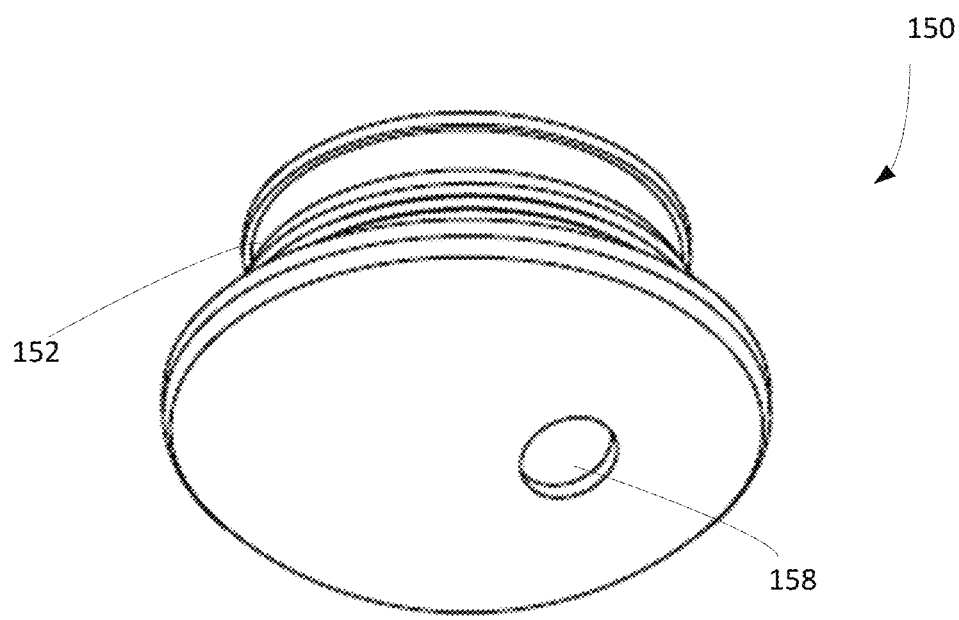
FIG. 8 is a perspective view of still another exemplary gasper nozzle.
Figure 9:
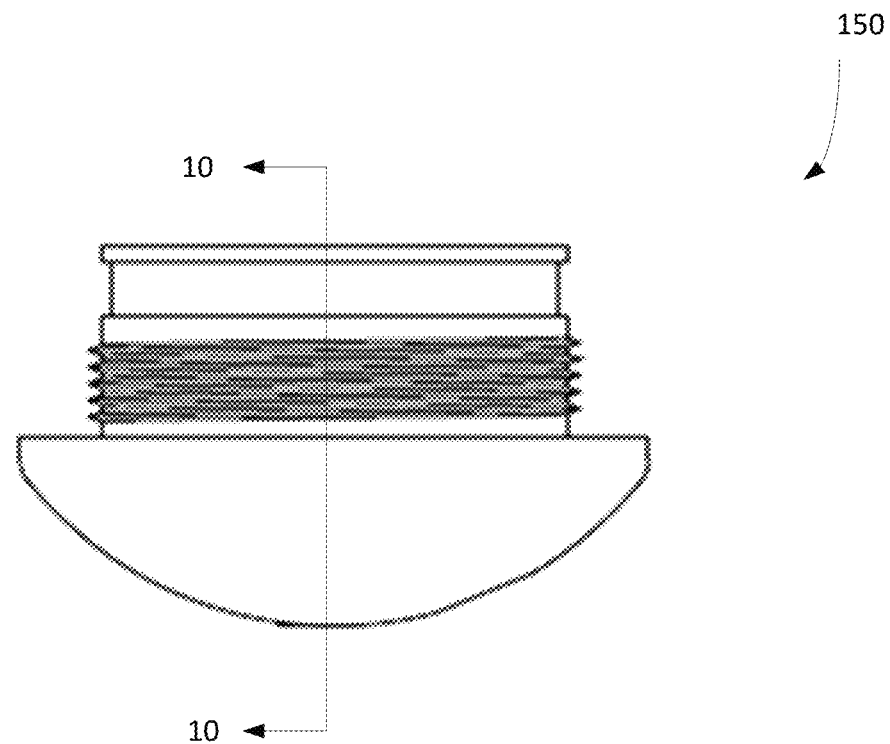
FIG. 9 is a side view of the gasper nozzle.
Figure 10:
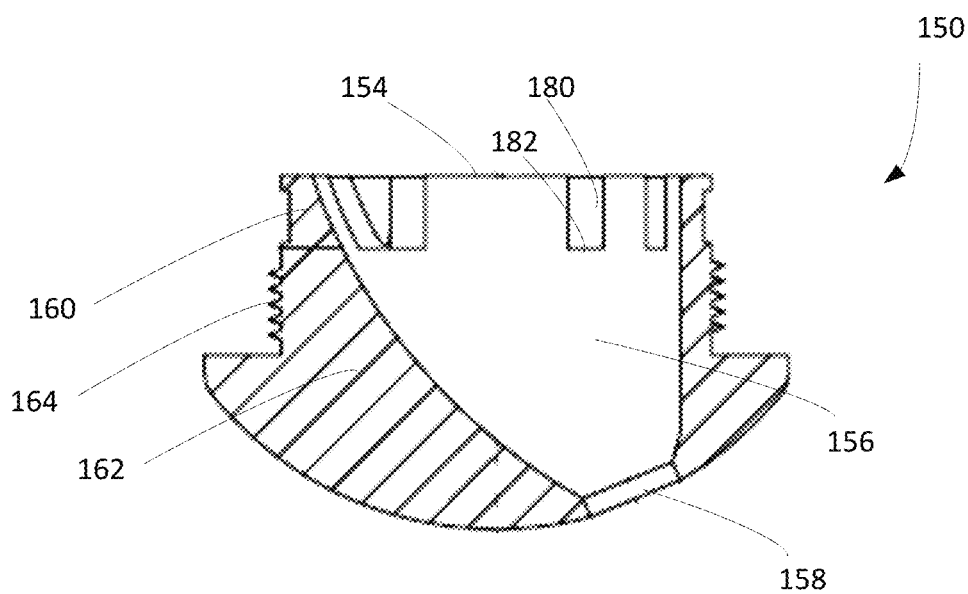
FIG. 10 is a cross-sectional view taken about line 10-10 in FIG. 9.
Figure 11:
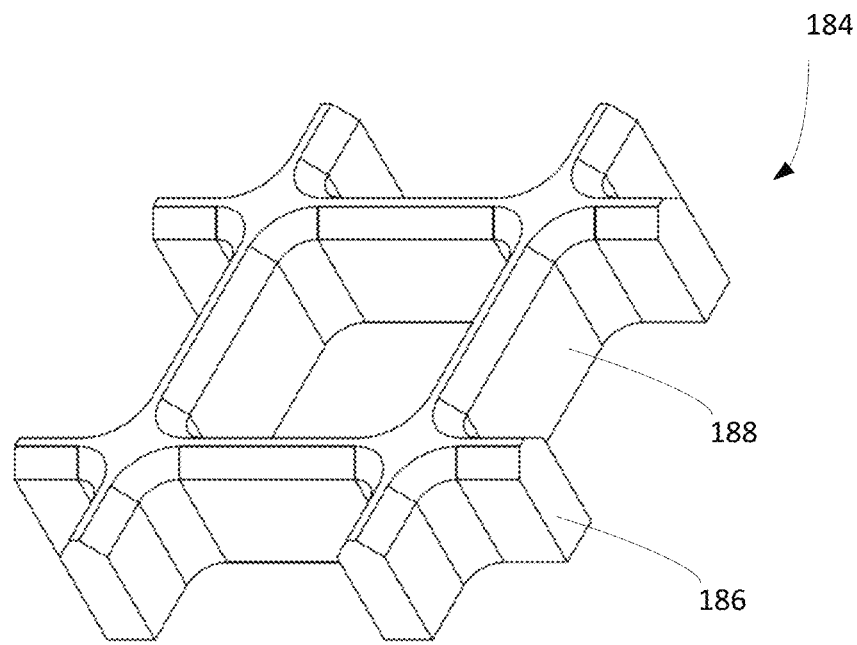
FIG. 11 is a perspective view of an exemplary flow straightener.
Figure 12:
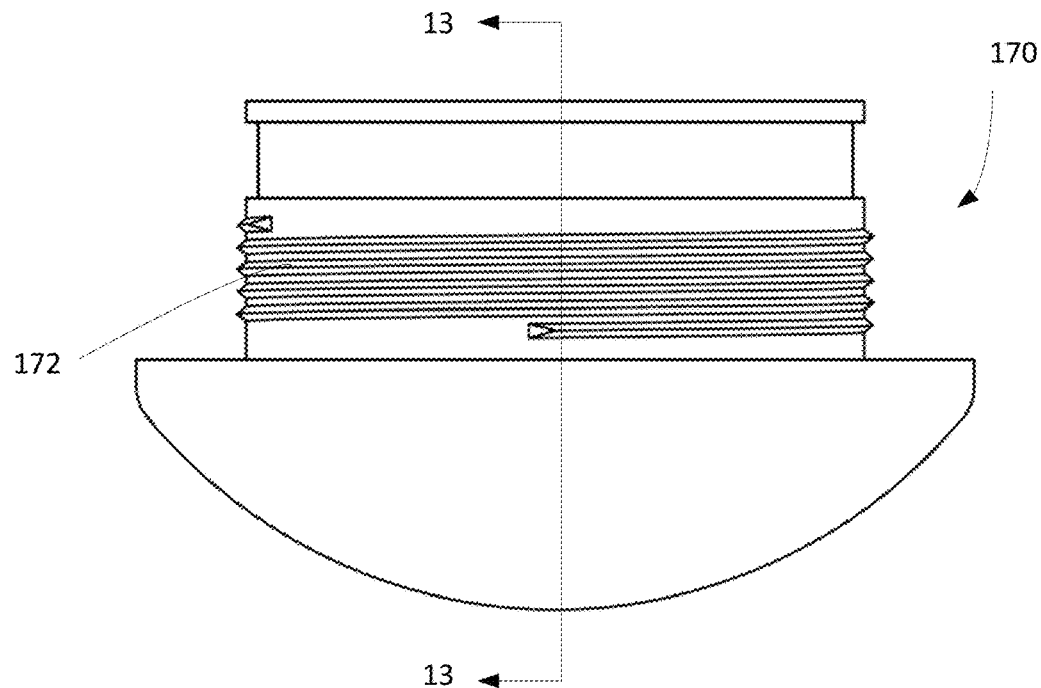
FIG. 12 is a front view of yet another exemplary gasper nozzle.
Figure 13:
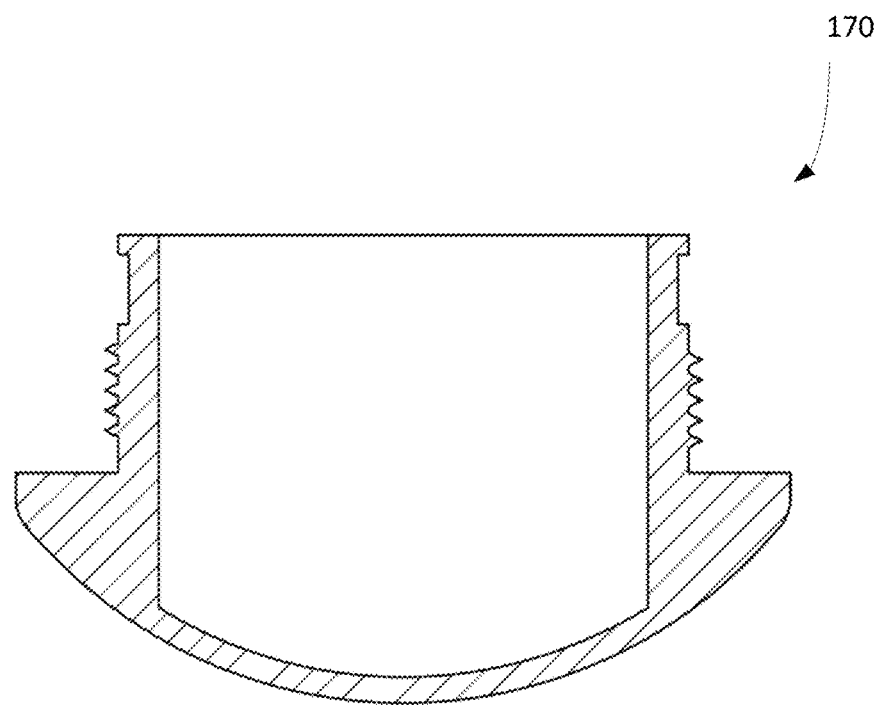
FIG. 13 is a cross-sectional view taken about line 13-13 in FIG. 12.
Figure 14:
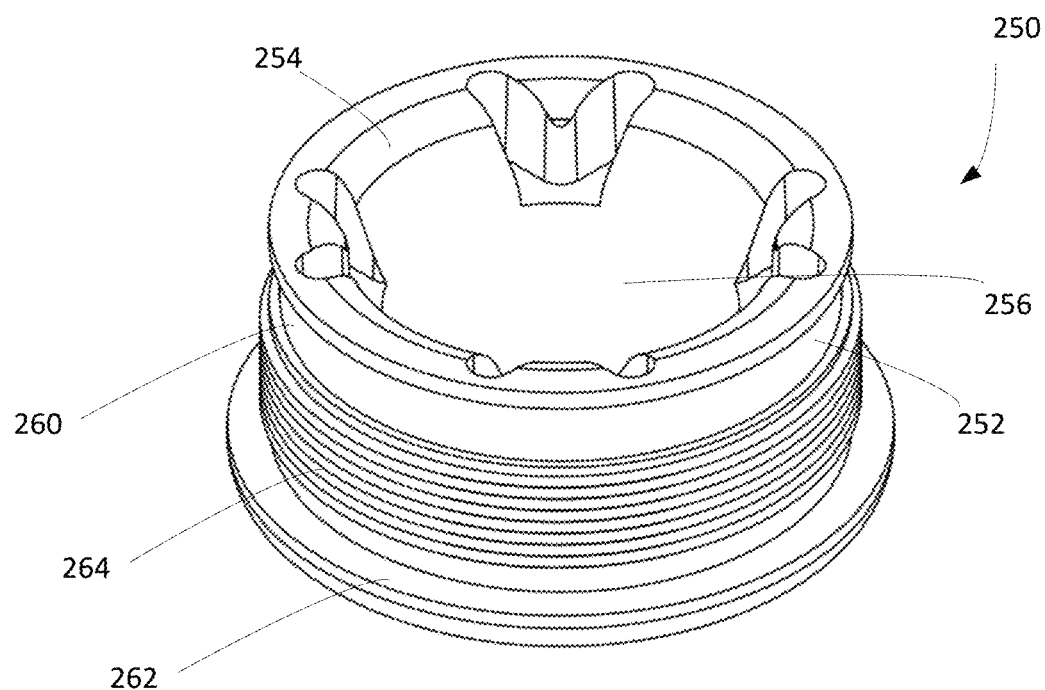
FIG. 14 is a perspective view of a further exemplary gasper nozzle.
Figure 15:
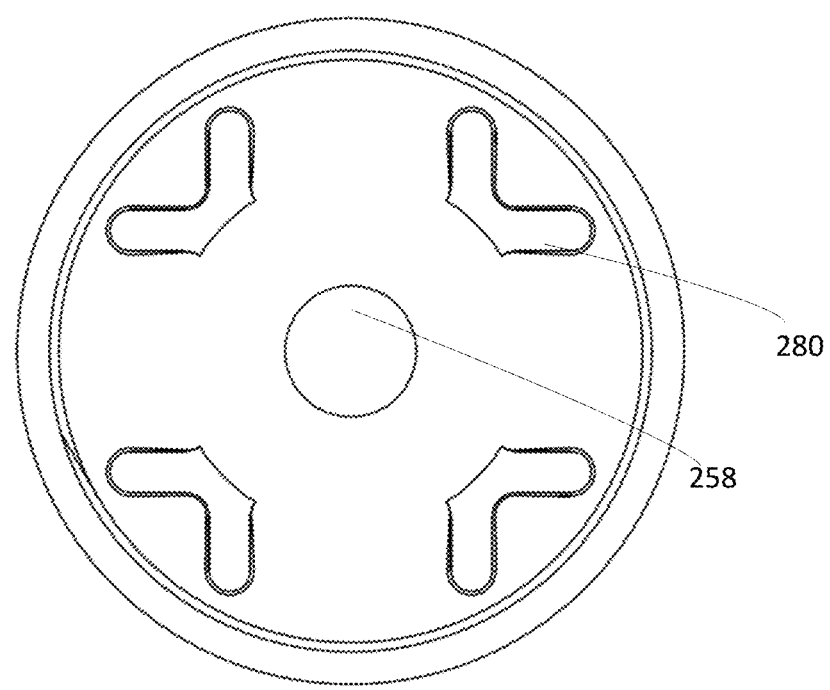
FIG. 15 is a top view of the gasper nozzle.
Figure 16:
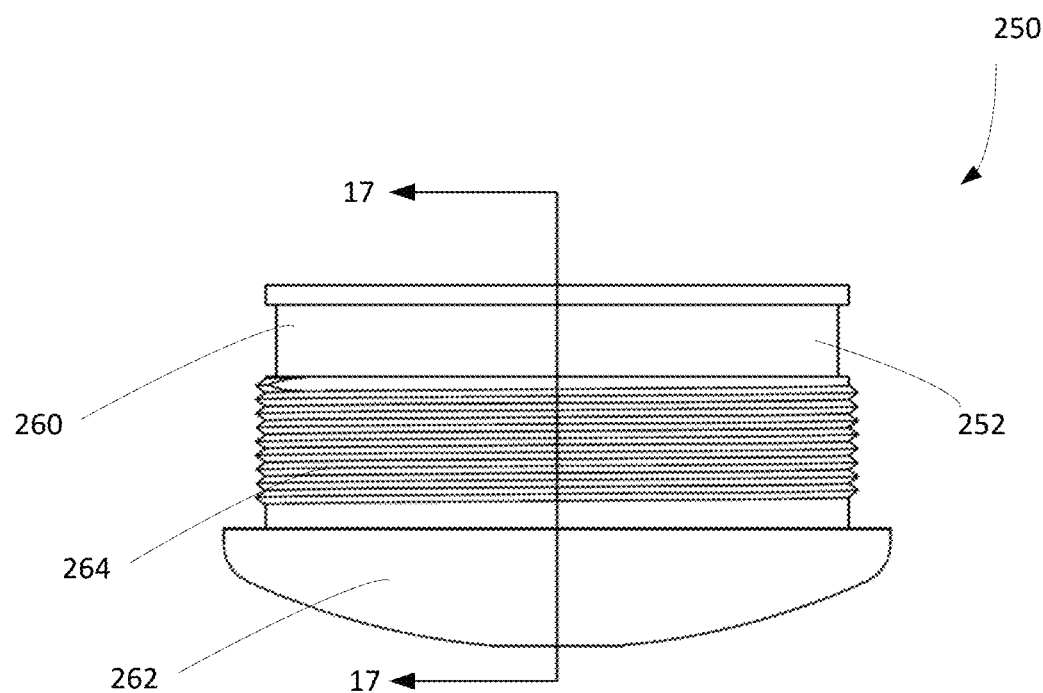
FIG. 16 is a side view of the gasper nozzle.
Figure 17:
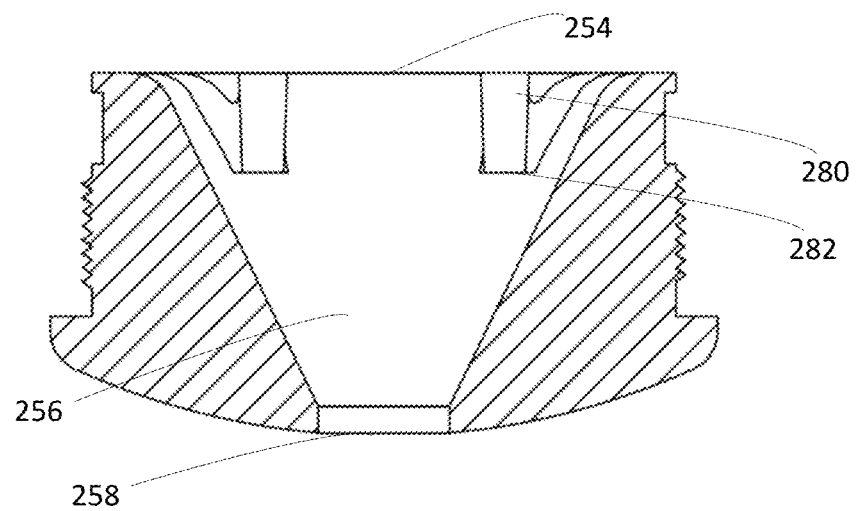
FIG. 17 is a cross-sectional view taken about line 17-17 in FIG. 16.
Figure 18:
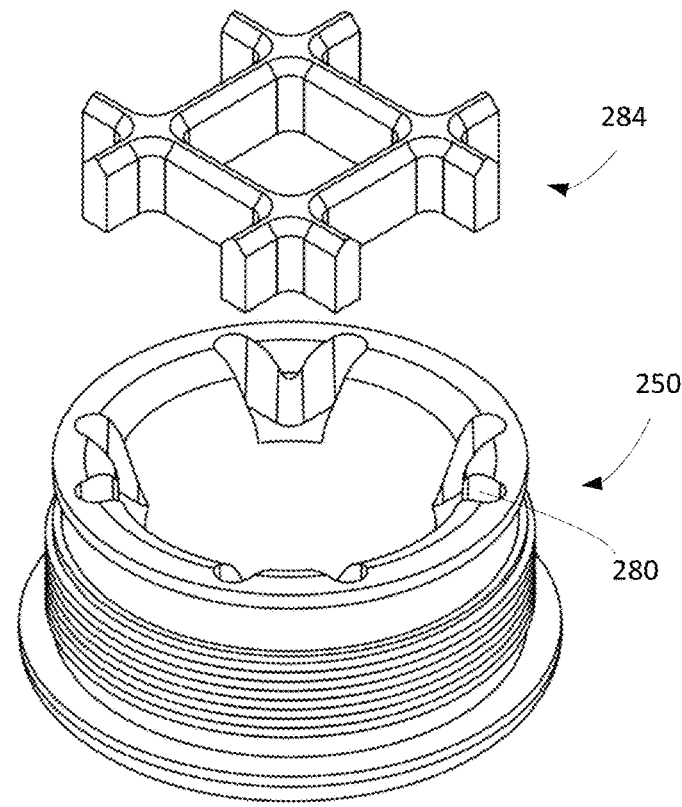
FIG. 18 is an exploded perspective view of the gasper nozzle and flow straightener.
Figure 19:
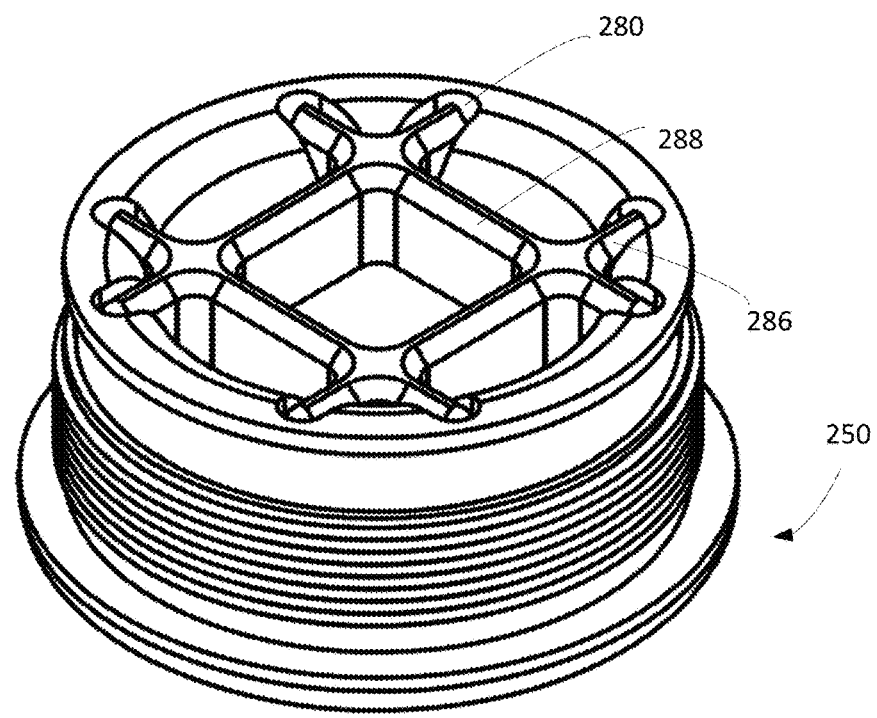
FIG. 19 is a perspective view of the gasper nozzle and flow straightener.
Figure 20:
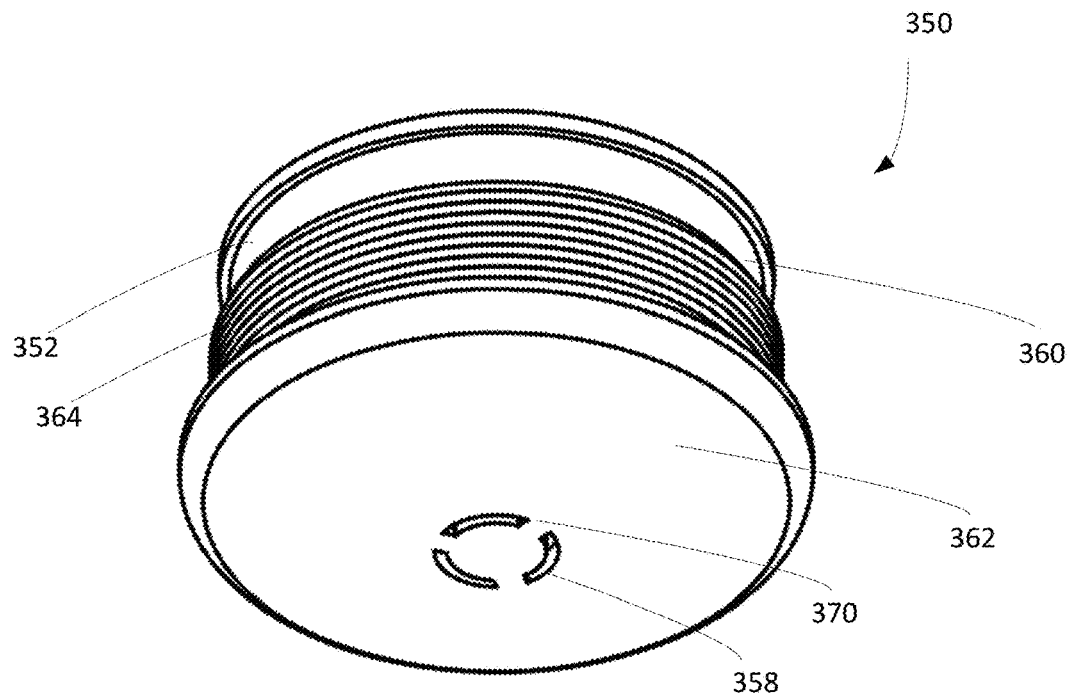
FIG. 20 is a perspective view is still another exemplary gasper nozzle.
Figure 21:
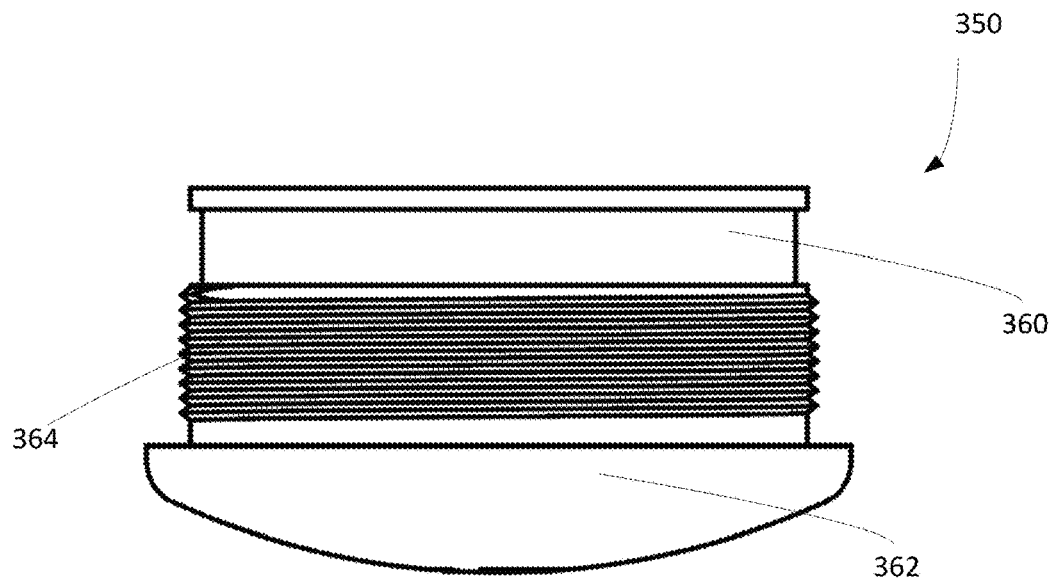
FIG. 21 is a front view of the gasper nozzle.
Figure 22:
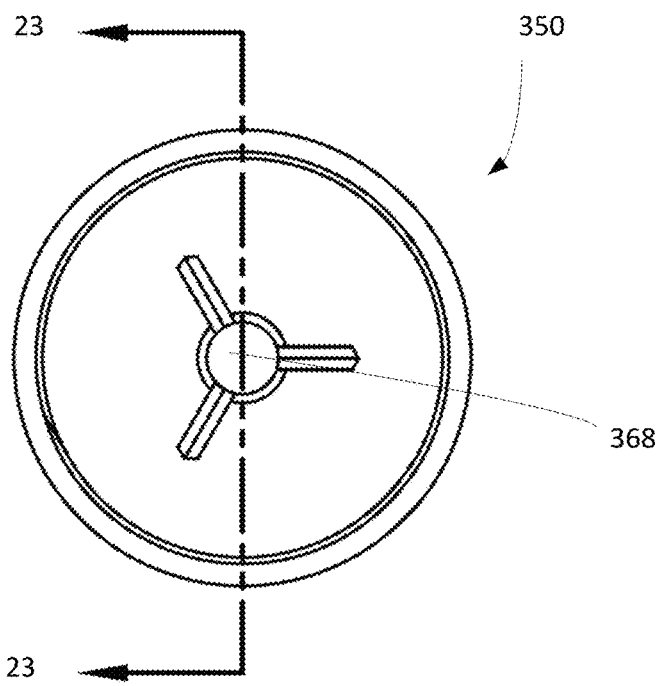
FIG. 22 is a top view of the gasper nozzle.
Figure 23:
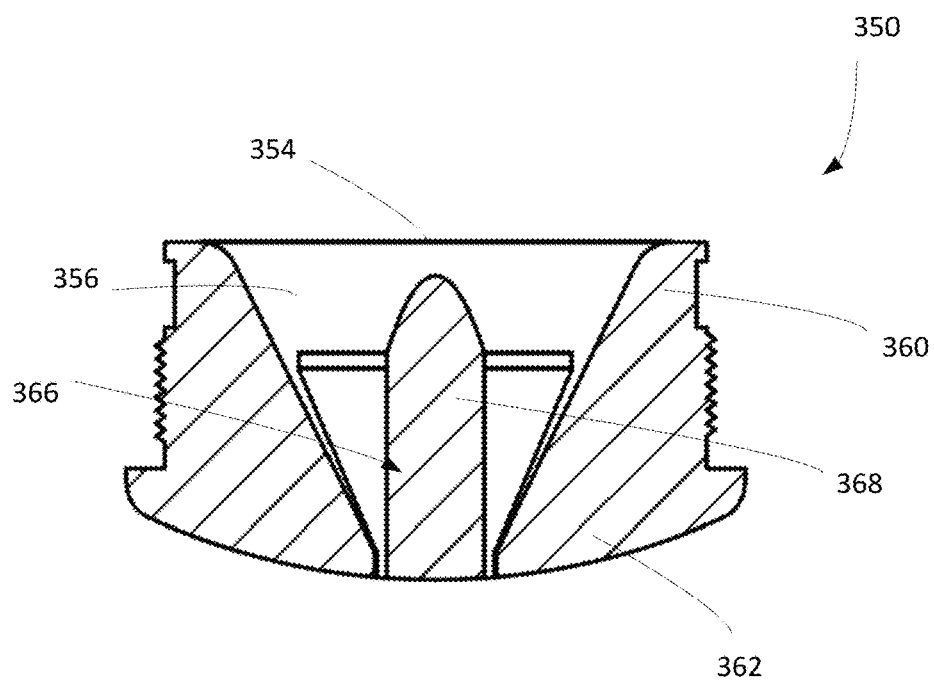
FIG. 23 is a cross-sectional view taken about line 23-23 in FIG. 22

Turning initially to FIG. 1, an exemplary aircraft cabin is illustrated at reference numeral 10. The aircraft cabin can include a plurality of side air inlets 12, for example in a ceiling 14 near sides of the aircraft, a plurality of air outlets 16 located in the sides of the aircraft near a floor, and/or one or more upper inlets 18. Also included is a plurality of gasper assemblies 22 above each set of seats 24. Each gasper assembly 22 can include a gasper panel 26, which can be part of a Passenger Service Unit (PSU), and a gasper for each seat connected to the gasper plate, for example first, second and third gaspers 28, 30, and 32. It will be appreciated that the inlet locations may be provided in any suitable location. It will also be appreciated that the embodiments described herein may be utilized on aircraft having any suitable seating configuration and any suitable number of aisle paths, such as a three by three configuration of seats 24 as shown, a three by two configuration, a three by three by three configuration, etc., having a suitable number of gaspers and a suitable supply of air.

In traditional aircraft cabins, when the gaspers 28, 30, and 32 are closed, air enters the aircraft cabin from the sidewall and/or ceiling air inlets and may flow along the ceiling 14 and/or ceiling 20 above the passengers. The nearly symmetric cabin allows the air from both sides of the cabin to meet near the aisle and circulate downward to the air outlets 16. When one or more of the gaspers 28, 30, and 32 are fully or partially opened, the nearly symmetrical airflow is disrupted, resulting in complicated airflow variations from seat to seat and/or row to row. The gaspers 28, 30, and 32 are primarily used by passengers according to individual comfort levels, and thus the airflow may be further disrupted due to passengers orienting the gasper air jets in different directions and different angles. This results in uneven flow distribution throughout the cabin causing passenger breaths to be entrained in various directions, resulting in increased levels of cross-contaminated air between passengers.

Turning now to FIGS. 2-5, an exemplary gasper nozzle is illustrated at reference numeral 50. The gasper nozzle 50 is designed to replace one or more of the gaspers 28, 30, and 32 and serves as either an attachment method that maintains proper alignment and acts as a seal to the external fixture and/or as a stand-alone solution in some cabin configurations.

The gasper nozzle 50 includes a body 52 having an inlet 54 configured to be connected to a source of air, a flow passage 56 in communication with the inlet 54 and extending through the body 52, and an outlet 58 in communication with the flow passage 56. The body 52 can have a substantially cylindrical portion 60 and a head portion 62, such as a substantially hemispherical or curved portion extending from the cylindrical portion 60 downward for optimizing downward directional airflow. The nozzle 50 can also include a stop mechanism and/or alignment tabs, such as a pair of arms 64 projecting upward from the cylindrical portion 60. Each arm 64 has a tab 66 for engaging respective slots in the gasper panel 26 to hold the gasper nozzle in position. It will be appreciated that the gasper nozzle 50 can be connected in other suitable ways, such as a threaded connection, adhesive, etc.

The body 50 attaches to the gasper panel 26 to extend perpendicular thereto. The gasper panel 26 has a longitudinal axis extending in a direction from one side of the aircraft cabin to the other, and the body 50 has a longitudinal axis extending in a direction from the ceiling of the aircraft cabin to the floor substantially perpendicular to the longitudinal axis of the gasper panel 26. The outlet 58 may be angled relative to the longitudinal axis of the body 50 providing a fixed outlet to control the direction of airflow exiting the gasper nozzle. The flow passage 56 can also be angled or sloped relative to the longitudinal axis. In an embodiment, the gasper nozzle 50 can receive a flow straightener (described in detail below) in the flow passage 56 to minimize upstream flow variations and control the path of airflow to combat the generation of sound created by turbulent eddies of non-uniform flow.

The gasper nozzle 50 supplies the cabin with optimized jets of airflow locked at specific angles. The direction of the airflow jets maintains the well-mixed cabin air while increasing the efficacy of the existing ventilation system by pushing exhaled aerosol by aircraft passengers toward the outlets 16 more efficiently. The design reduces the cross-contamination of exhaled aerosol between passengers interrupting the recirculation zone where aerosol remains suspended and recirculated for longer periods of time, reducing the transmission of potentially contaminated aerosol to other passengers. The cabin cross-section geometry, locations of inlets and outlets, seat path, PSU location, gasper position within the PSU and relative to the seats and passengers, etc. vary between aircraft. Due to these differences, the output angle of airflow from the Environmental Control System (ECS) and relative angle of the flow path according to cabin dimensions, gasper position, angle of the flow straighteners, etc. may be modified to optimize the configuration for the various aircraft.

In an embodiment where each gasper 28, 30, and 32 is replaced with one of the gasper nozzles 50, the gasper nozzles 50 can be configured differently from one another. For example, the first or window gaspers 28 can be replaced with a gasper nozzle 50 having the outlet 58 angled outward toward the window to direct exhaled aerosol from the window seat passenger toward the outlet 16. The third or aisle gasper 32 can be replaced with a gasper nozzle 50 having the outlet 58 angled outward toward the aisle to direct exhaled aerosol from the aisle seat passenger toward the flow of air moving to the outlet 16. The second or middle gasper 30 can be replaced with a gasper nozzle 50 having the outlet 58 angled forward away from the middle seat passenger toward the back of the seat in front of the passenger to direct exhaled aerosol not captured by the other gasper nozzles downward toward the flow of air moving to the outlet 16. In certain embodiments in which the existing location of the gaspers is unfavorable in relation to the seating arrangement, an external fixture may also be adapted to in the correct directional airflow from the gaspers into the cabin.

Turning now to FIGS. 6 and 7, a gasper nozzle 70 is illustrated that can be used to block airflow from a gasper 30 or gasper nozzle 50. The gasper nozzle 70 is substantially the same as the gasper nozzle 50 and thus the same description applies, except the gasper nozzle 70 does not include an outlet. The gasper nozzle 70 thereby prevents airflow through the gasper. In certain embodiments, this aids in the minimization of cross-contaminated air by allowing some portions of exhaled aerosol to pass along the ceiling above the passengers and be swept away by the sidewall flow air to meet in the aisle area and be pushed toward the air outlet. For example, by blocking the middle gasper, the configuration allows the window and aisle gaspers to pull exhaled aerosol away from the middle seat passenger towards the outlets as described above.

Turning now to FIGS. 8-10, an exemplary embodiment of the gasper nozzle is shown at 150. The gasper nozzle 150 is substantially the same as the above-referenced gasper nozzle 50, and consequently the same reference numerals but indexed by 100 are used to denote structures corresponding to similar structures in the gasper nozzle. In addition, the foregoing description of the gasper nozzle 50 is equally applicable to the gasper nozzle 150 except as noted below.

The gasper nozzle 150 includes a body 152 having an inlet 154 configured to be connected to a source of air, a flow passage 156 in communication with the inlet 154 and extending through the body 152, and an outlet 158 in communication with the flow passage 156. The flow passage 156 and the outlet 158 are angled relative to the longitudinal axis of the nozzle 150. The body 152 can have a substantially cylindrical portion 160 and a head portion 162. The nozzle 150 can also include threads 164 on an outer surface of the cylindrical portion 160 for mating with corresponding threads on the gasper panel 26 and may serve as an attachment method for an external fixture to aid in the control of the angle of the outward air jets, for example in aircraft cabins with unfavorable gasper and/or PSU locations. The threads may provide a stop mechanism for alignment to ensure the proper outward flow angle. It will be appreciated that the gasper nozzle 150 may also be provided without an outlet similar to the gasper nozzle 70.

Turning additionally to FIG. 11, the body 152 also includes a plurality of slots 180 each having a ledge 182 in the flow passage 156 for engaging with a flow straightener 184 to hold the flow straightener 184. The flow straighteners may be fully submersed within the interior of the nozzle, or exposed upwards as needed depending on the supplied flow from a gasper hose, the corresponding flow path, intended outward flow direction, and/or the intended angle of the flow straightener. The flow straightener 184 includes a plurality of legs 186 connected to portions 188 to form a suitably shaped straightener for directing airflow, such as a substantial pound sign shape as shown. The legs 186 are each received in one of the slots 180 and a bottom of each leg 186 abuts the respective ledge 182 to hold the flow straightener in position. Air flows through the inlet 154 and through the flow straightener 184, which controls the path of airflow entering the nozzle 150. To ensure a smooth transition of airflow entering the flow passage 156, the depths of the ledges 182 can be varied to vary the angle of the flow straightener. Although shown as separate components, it will be appreciated that the nozzles and flow straighteners may be integrally formed, for example by injection molding.

Turning now to FIGS. 12 and 13, a gasper nozzle 170 is illustrated that can be used to block airflow from a gasper 30 or gasper nozzle 150. The gasper nozzle 170 is substantially the same as the gasper nozzle 150 and thus the same description applies, except the gasper nozzle 170 does not include an outlet. The gasper nozzle 170 thereby prevents airflow through the gasper. In certain embodiments, this aids in the minimization of cross-contaminated air by allowing some portions of exhaled aerosol to pass along the ceiling above the passengers and be swept away by the sidewall flow air to meet in the aisle area and be pushed toward the air outlet. For example, by blocking the middle gasper, the configuration allows the window and aisle gaspers to pull exhaled aerosol away from the middle seat passenger towards the outlets as described above. The threads 172 provide a stop mechanism for alignment.

Turning now to FIGS. 14-29, an exemplary embodiment of the gasper nozzle is shown at 250. The gasper nozzle 250 is substantially the same as the above-referenced gasper nozzle 150, and consequently the same reference numerals but indexed by 100 are used to denote structures corresponding to similar structures in the gasper nozzle. In addition, the foregoing description of the gasper nozzle 150 is equally applicable to the gasper nozzle 250 except as noted below.

The gasper nozzle 250 includes a body 252 having an inlet 254 configured to be connected to a source of air, a flow passage 256 in communication with the inlet 254 and extending through the body 252, and an outlet 258 in communication with the flow passage 156. The flow passage 256 has angled or curved portions relative to the longitudinal axis for controlling flow. The body 252 can have a substantially cylindrical portion 260 and a head portion 262. The nozzle 250 can also include threads 264 on an outer surface of the cylindrical portion 260 for mating with corresponding threads on the gasper panel 26. Although shown as a single component, it will be appreciated that the nozzles and threads may be integrally formed or manufactured separately and assembled. In an embodiment, to achieve an angled output of airflow, the angle of installation can be adjusted, for example by having the threads 264 at an angle.

The body 252 also includes a plurality of slots 280 each having a ledge 282 in the flow passage 256 for engaging with the flow straightener 284 to hold the flow straightener 284. The flow straightener 284 includes a plurality of legs 286 connected to portions 288. The legs 286 are each received in one of the slots 280 and a bottom of each leg 286 abuts the respective ledge 282 to hold the flow straightener in position. The depths of the ledges 282 can be varied to vary the angle of the flow straightener.

Turning now to FIGS. 20-23, an exemplary embodiment of the gasper nozzle is shown at 350. The gasper nozzle 350 is substantially the same as the above-referenced gasper nozzle 150, and consequently the same reference numerals but indexed by 200 are used to denote structures corresponding to similar structures in the gasper nozzle. In addition, the foregoing description of the gasper nozzle 150 is equally applicable to the gasper nozzle 350 except as noted below.

The gasper nozzle 350 includes a body 352 having an inlet 354 configured to be connected to a source of air, a flow passage 356 in communication with the inlet 354 and extending through the body 352, and one or more outlets 358, and as shown three circumferentially spaced curved outlets in communication with the flow passage 356. The body 352 can have a substantially cylindrical portion 360 and a head portion 362. The nozzle 350 can also include threads 364 on an outer surface of the cylindrical portion 360 for mating with corresponding threads on the gasper panel 26 and may serve as an attachment method for an external fixture.

The gasper nozzle 350 also includes a plug 366 in the flow passage 356 extending along the axis. The plug 366 may be integrally formed with the body or secured thereto in any suitable manner. The plug 366 includes a body 368 and outwardly extending legs 370 that form with the head portion 362 the outlets 358. The plug 366 can help guide flow and block debris from being inserted into the nozzle.

Figure 24:
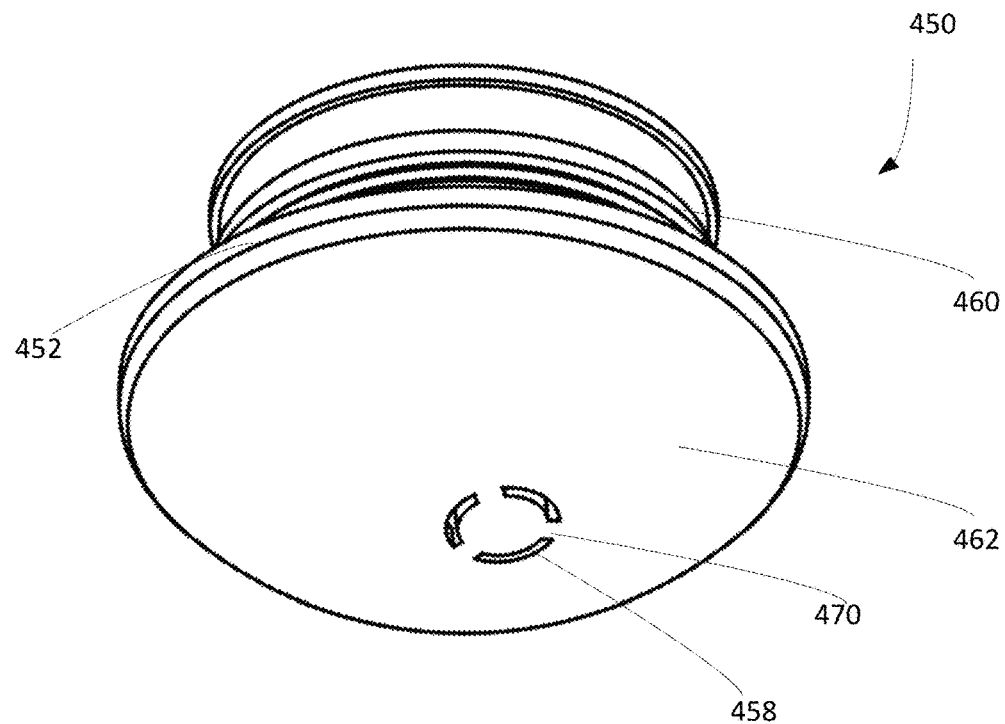
FIG. 24 is a perspective view of a further exemplary gasper nozzle.
Figure 25:
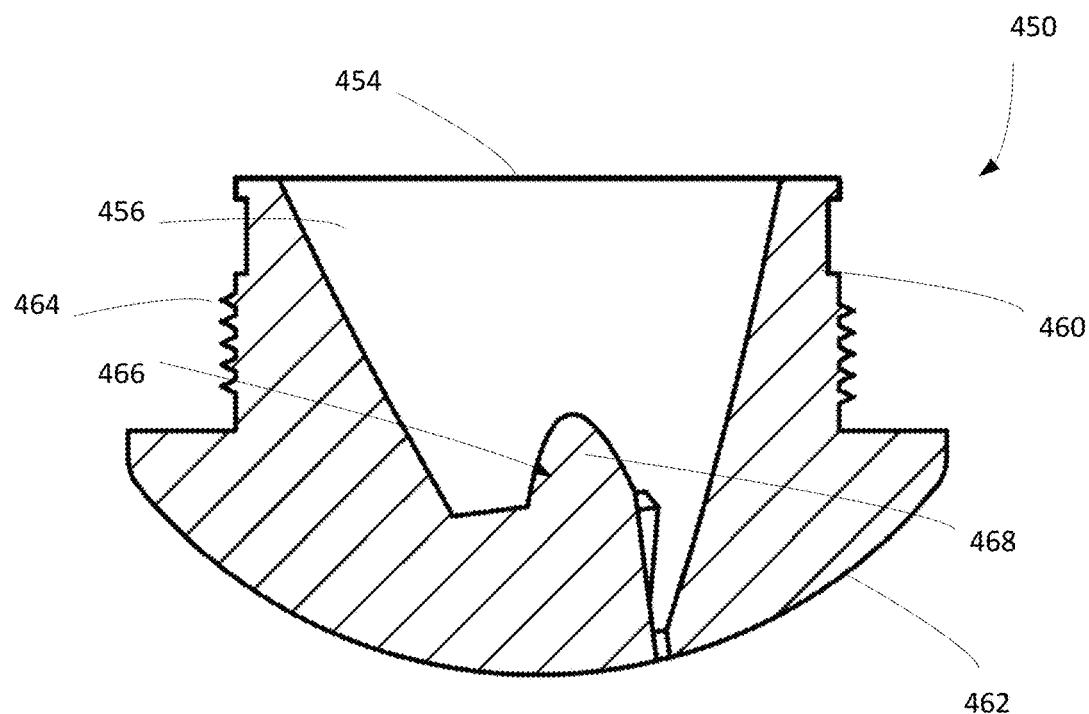
FIG. 25 is a cross-sectional view taken about line 25-25 in FIG. 24.

Turning now to FIGS. 24-25, an exemplary embodiment of the gasper nozzle is shown at 450. The gasper nozzle 450 is substantially the same as the above-referenced gasper nozzle 350, and consequently the same reference numerals but indexed by 100 are used to denote structures corresponding to similar structures in the gasper nozzle. In addition, the foregoing description of the gasper nozzle 450 is equally applicable to the gasper nozzle 450 except as noted below.

The gasper nozzle 450 includes a body 452 having an inlet 454 configured to be connected to a source of air, a flow passage 456 in communication with the inlet 454 and extending through the body 452, and one or more outlets 458, and as shown three circumferentially spaced curved outlets in communication with the flow passage 456. The flow passage 456 and the outlet 458 are angled relative to the longitudinal axis of the nozzle 450. The body 352 can have a substantially cylindrical portion 460 and a head portion 462. The nozzle 450 can also include threads 464 on an outer surface of the cylindrical portion 460 for mating with corresponding threads on the gasper panel 26 and may serve as an attachment method for an external fixture.

The gasper nozzle 450 also includes a plug 466 in the flow passage 456 angled relative to the axis. The plug 466 may be integrally formed with the body or secured thereto in any suitable manner. The plug 466 includes a body 468 and outwardly extending legs 470 that form with the head portion 462 the outlets 458. The plug 466 can help guide flow and block debris from being inserted into the nozzle.

Figure 26:
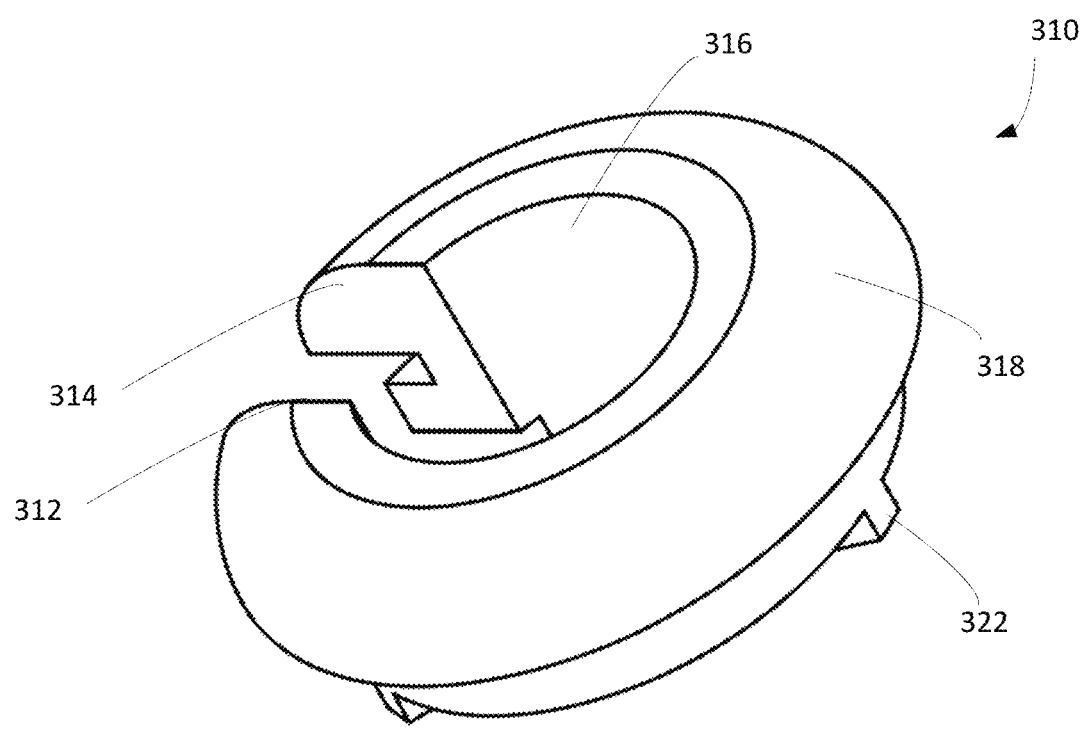
FIG. 26 is a perspective view of an exemplary gasper clip.
Figure 27:
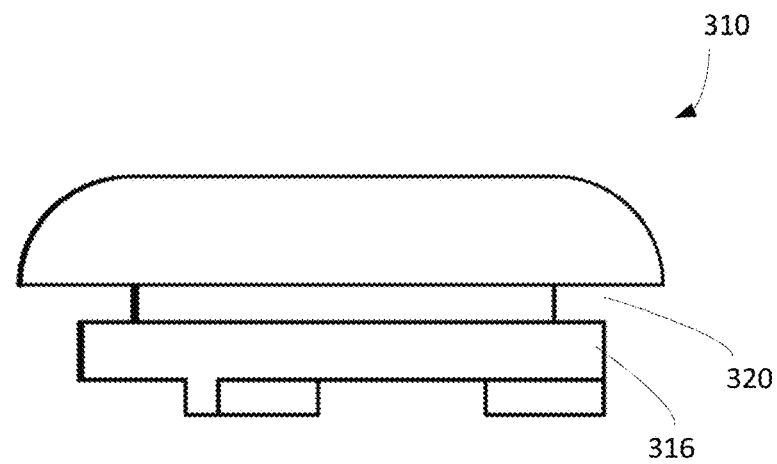
FIG. 27 is a side view of the gasper clip.
Figure 28:
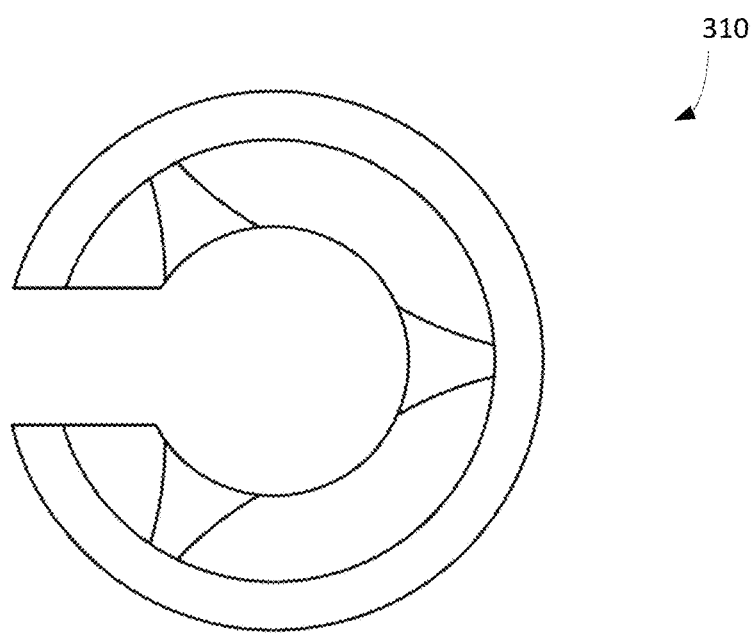
FIG. 28 is a bottom view of the gasper clip.

Turning now to FIGS. 26-28, an exemplary gasper nozzle clip is illustrated at reference numeral 310. The gasper nozzle clip 310 may be installed in addition to any of the above-described gasper nozzles and/or a gasper of an aircraft, such as gaspers 28, 30, and 32, to hold the gasper in an open position allowing air to flow through the gasper. The gasper nozzle clip 310 is installed at the opening of the gasper nozzle to prevent passenger interference with the gasper nozzle opening, such as pushing debris inside. The gasper nozzle clip 310 has a substantially circular shape and may have a first and second end 312 and 314 circumferentially spaced from one another to allow the gasper nozzle clip to be positioned in the gap of the gasper nozzle. The gasper nozzle clip 310 includes a circumferential lip 316 forming with outer surface 318 a channel 320 that abuts the edge of the gasper, and feet/alignment tabs 322 for allowing airflow to pass through or around the clip.

Figure 29:
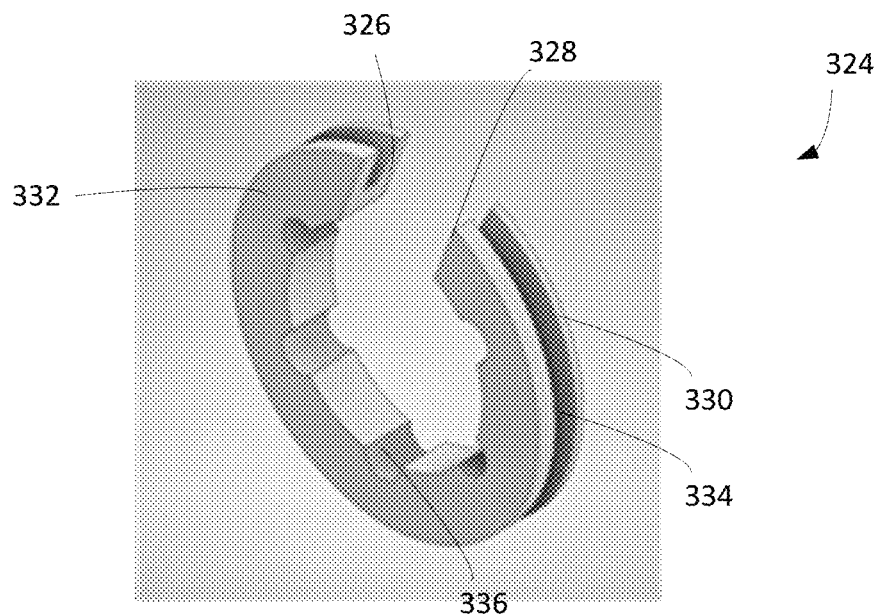
FIG. 29 is a perspective view of another exemplary gasper clip.

Turning now to FIG. 29, another exemplary gasper nozzle clip is illustrated at reference numeral 324. The gasper nozzle clip 324 may be installed in addition to any of the above-described gasper nozzles and/or a gasper of an aircraft, such as gaspers 28, 30, and 32, to hold the gasper in an open position allowing air to flow through the gasper. The gasper nozzle clip 324 is installed at the opening of the gasper nozzle to prevent passenger interference with the gasper nozzle opening, such as pushing debris inside. The gasper nozzle clip 324 has a substantially circular shape and may have a first and second end 326 and 328 circumferentially spaced from one another to allow the gasper clip to be positioned in the gap of the gasper nozzle. The gasper clip 324 includes inner and outer surfaces 330 and 332 that form a channel 334 that abuts the edge of the gasper, and includes divets 336 for allowing airflow to pass through or around the clip.

Figure 30:
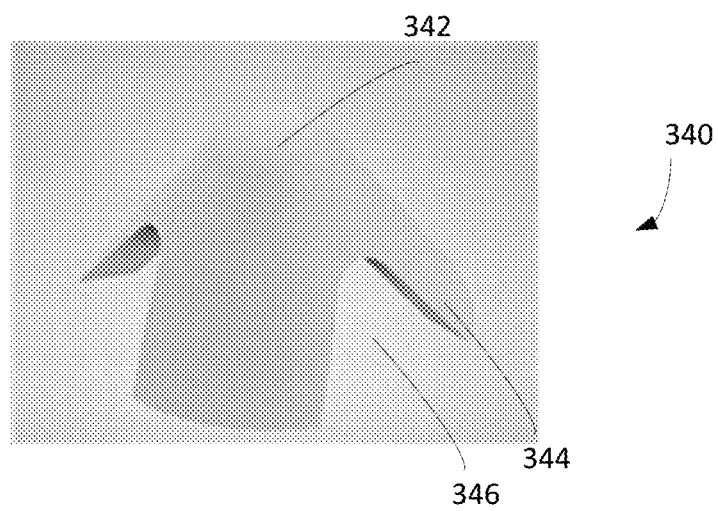
FIG. 30 is a perspective view of still another exemplary gasper clip.

Turning now to FIG. 30, another exemplary gasper clip is illustrated at reference numeral 340. The gasper nozzle clip 340 may be installed in addition to any of the above-described gasper nozzles and/or a gasper of an aircraft, such as gaspers 28, 30, and 32, to hold the gasper in an open position allowing air to flow through the gasper. The gasper nozzle clip 340 is installed at the opening of the gasper nozzle to prevent passenger interference with the gasper nozzle opening, such as pushing debris inside. The gasper nozzle clip 340 has a conical shape with a body 342 having a plurality of circumferentially spaced legs 344 defining gaps 346 therebetween for airflow. The legs 344 are inserted into the gasper when it is in the open position to hold it open and allow air to pass through or around the gaps 346.

Figure 31:
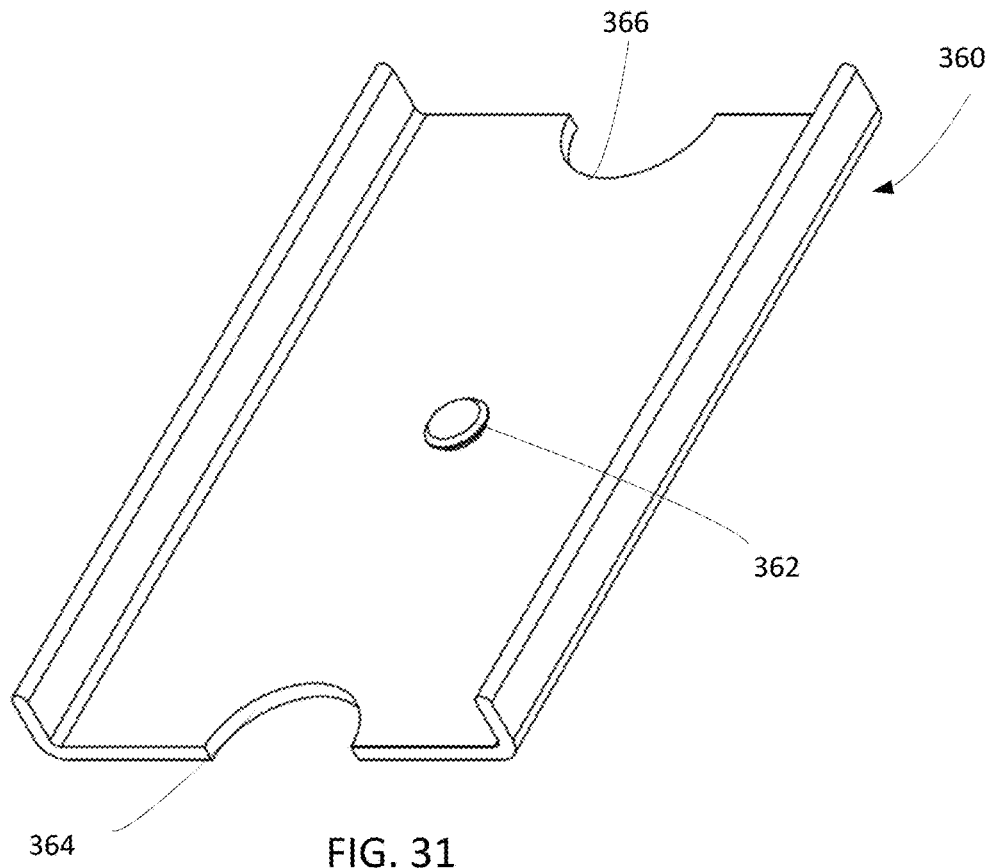
FIG. 31 is a perspective view of an exemplary gasper plate.
Figure 32:
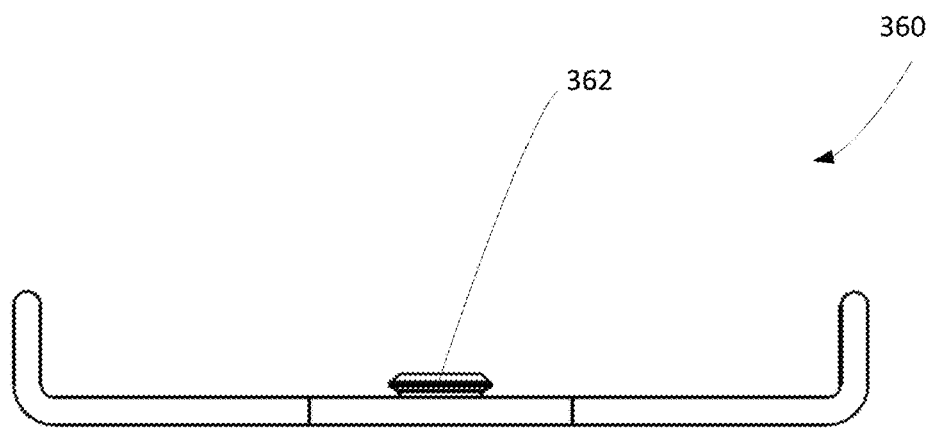
FIG. 32 is an end view of the gasper plate.

Turning now to FIGS. 31 and 32, an exemplary gasper plate is illustrated at reference numeral 360. The gasper plate 360 is configured to fit overtop an existing gasper panel, such as over a row of three gaspers 28, 30, 32. The gasper plate may include a projection 362 configured to attach to the middle gasper 30 for securing the gasper plate 360 to the aircraft and to block flow and hold the middle gasper 30 closed to minimize cross-contamination of air. The gasper plate 360 also includes first and second cutouts 364 and 366 on ends of the plate 360 to hold the end gaspers 28 and 32 at desired angles, for example, to direct the airflow outwards as discussed above. The gasper plate 360 may be used with the gasper clips 310, 324, or 340 or other suitable gasper clips to hold the gaspers 28 and 32 open. The above-described gasper nozzles may be used to replace the existing gaspers and modify the jet angle and serve as an attachment method of the external fixture. The gasper plate may be used to enclose the air provided by the ECS before redirecting the outward flow into the cabin.

Figure 33:
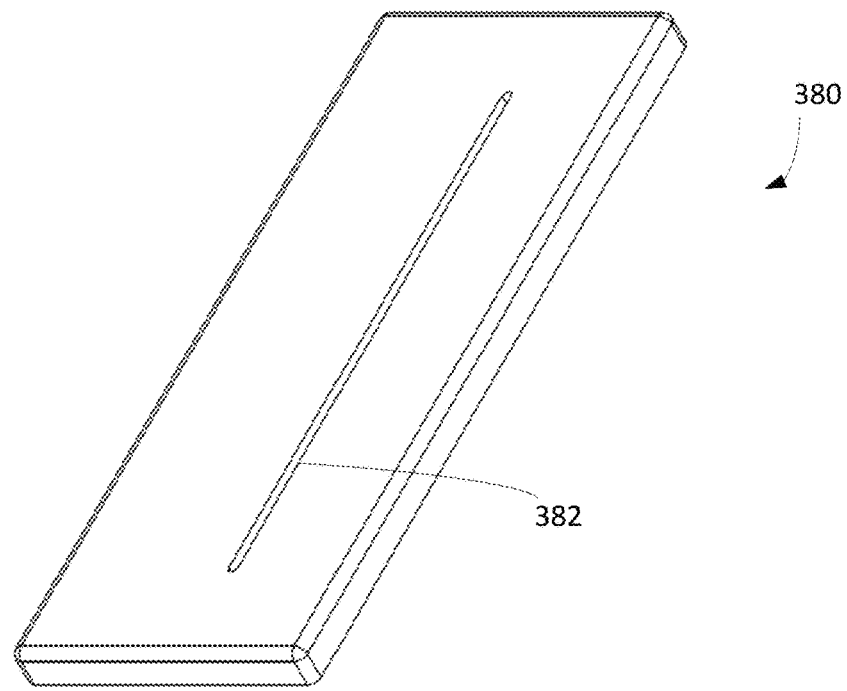
FIG. 33 is a perspective view of another exemplary gasper plate.
Figure 34:
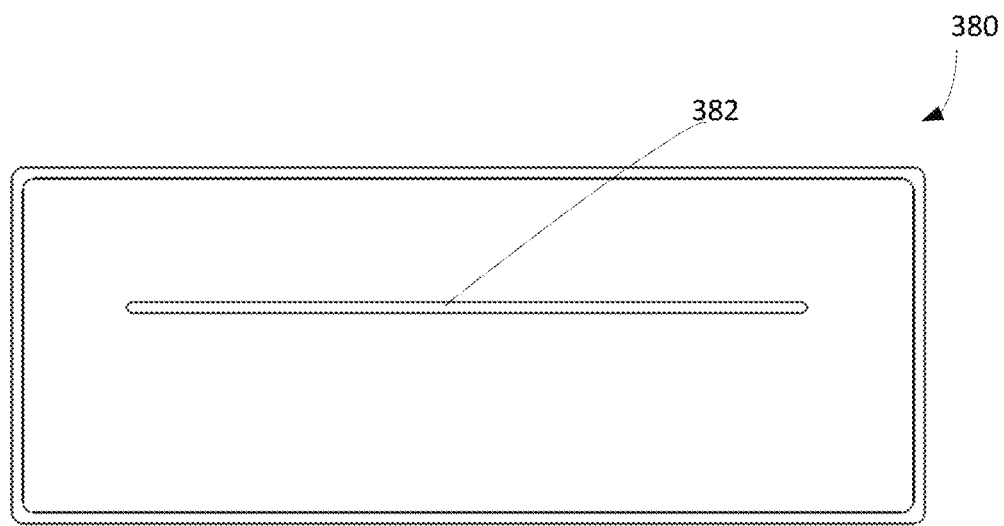
FIG. 34 is a bottom view of the gasper plate.
Figure 35:
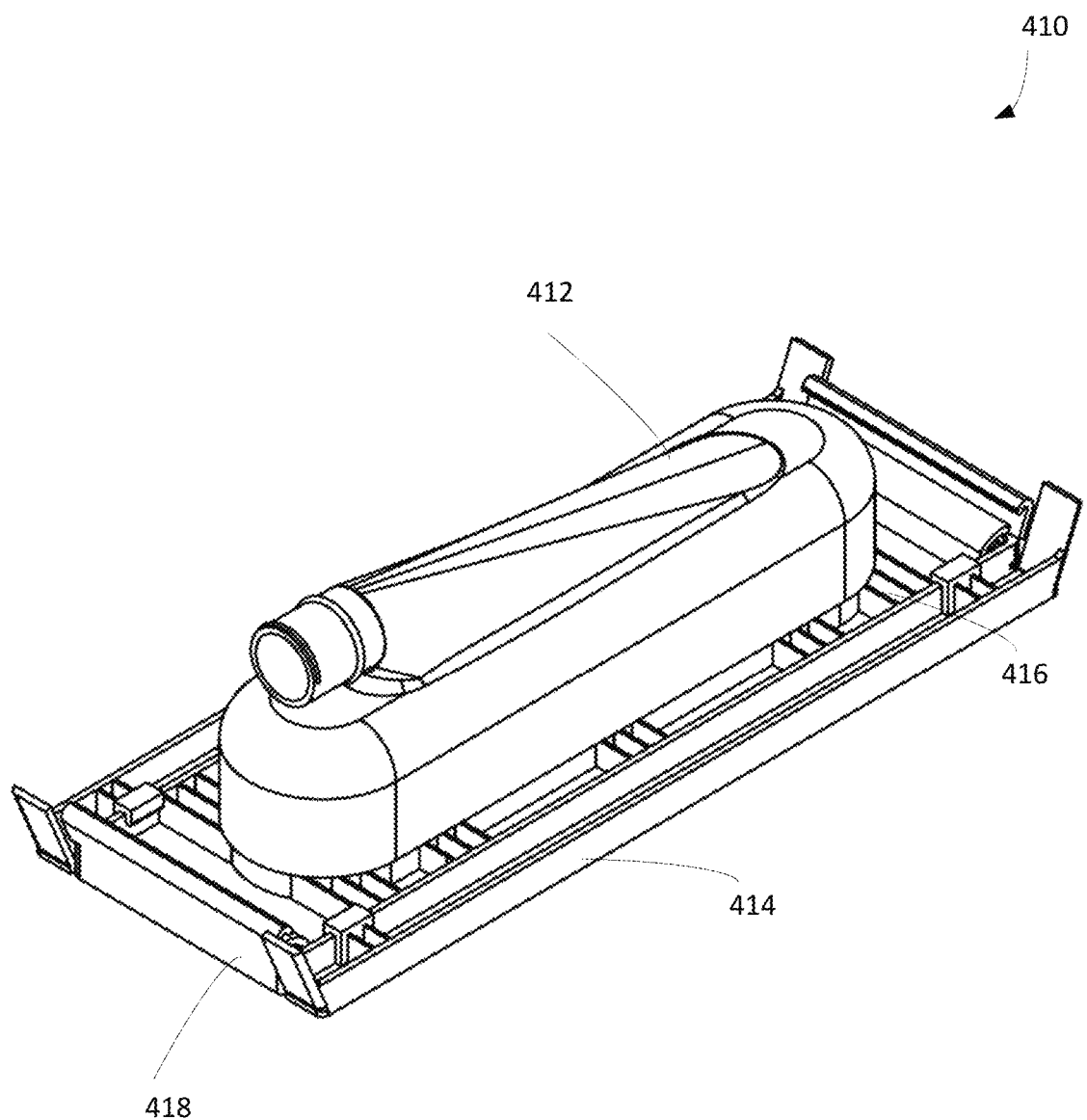
FIG. 35 is a perspective view of an exemplary airflow assembly.
Figure 36:
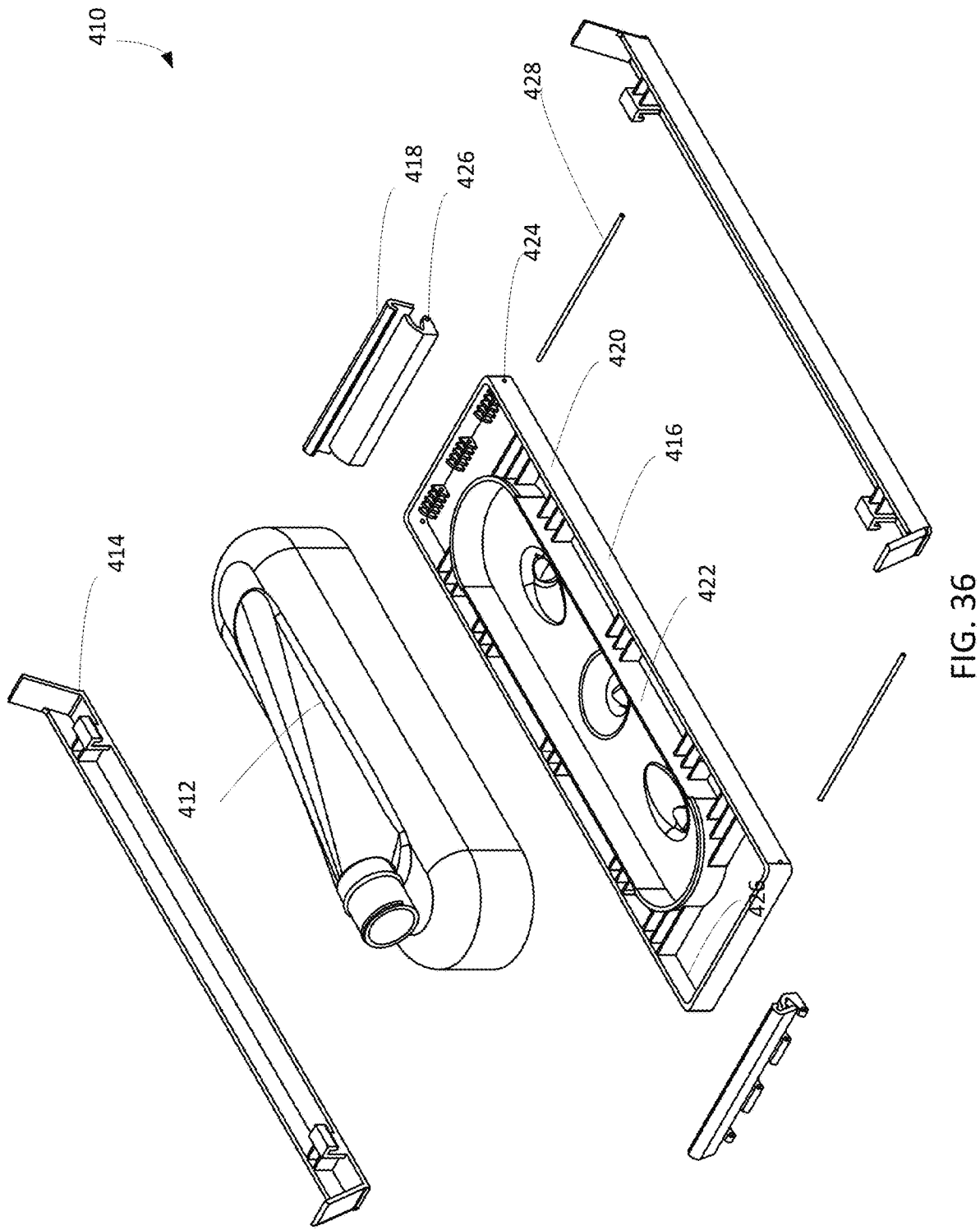
FIG. 36 is an exploded view of the airflow assembly.
Figure 37:
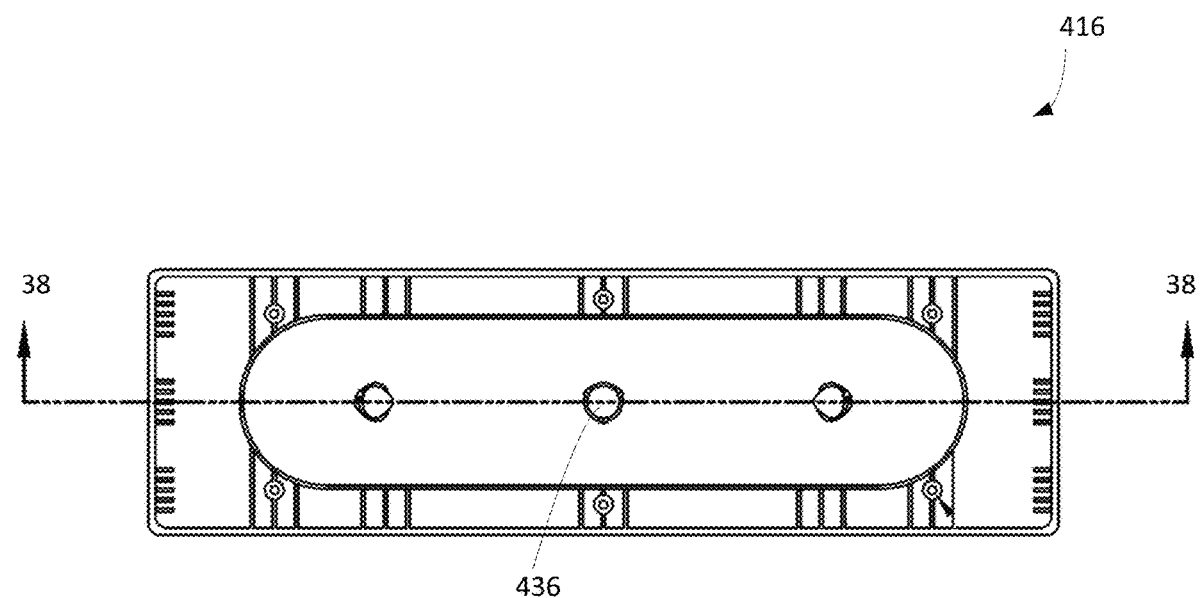
FIG. 37 is a top view of a gasper panel of the airflow assembly.
Figure 38:
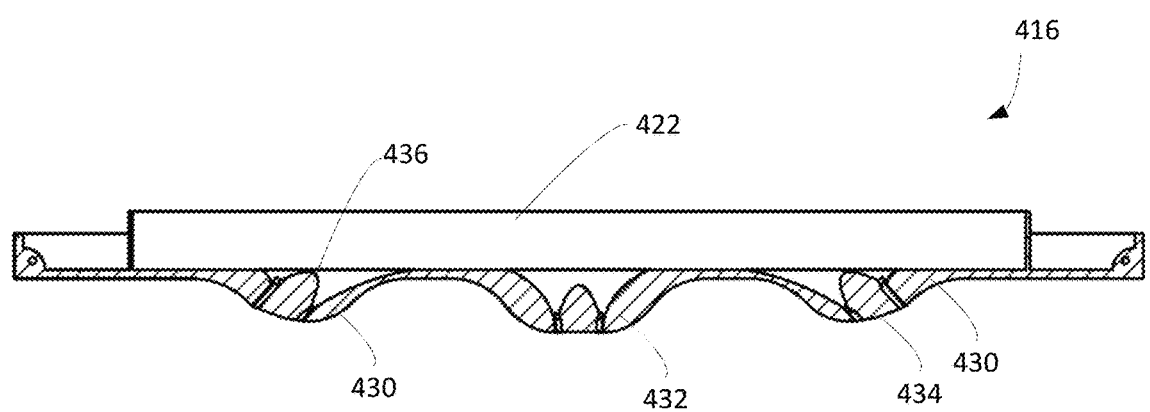
FIG. 38 is a cross-sectional view taken about line 38-38 in FIG. 37.

Turning now to FIGS. 33 and 34, an exemplary gasper panel is illustrated at reference numeral 380. The gasper pane 380 can replace an existing gasper panel and nozzle assembly on an aircraft, and includes one or more slots 382, openings, or the like, or a combination thereof for airflow through the panel. The slots or openings can create a continuous air curtain or positioned to direct air in specific directions, for example by including slots or openings to direct air in predetermined directions as discussed above. The gasper panel is configured to attach to an airflow distributor connected to gasper hoses. The panel may alternatively be assembled to the nozzles.

Turning now to FIGS. 35-38, an exemplary airflow assembly is illustrated at reference numeral 410. The assembly 410 includes an air distributor 412 configured to be coupled to a gasper hose of the aircraft, a gasper panel 416 attached to the air distributor 412, optional spacers 414 that can be attached to the gasper panel to fill a gap in the ceiling for some aircraft, and one or more fasteners 418 for attaching the gasper panel 416 to the PSU and/or the lower ceiling 14.

The gasper panel 416 includes a base 420, a projection 422 projecting upward from the base around which the air distributor 412 is received, and a plurality of openings 424 perpendicular to the longitudinal axis of the panel 416. The air distributor 412 can be sealed to the projection 422 in a suitable manner, such as by a gasket around a perimeter of the distributor that is secured to the panel 416 in a suitable manner. The fasteners 418, shown as hooks, include openings 426 that align with the openings 424 to receive a pin 428 to hold the fasteners 418 to the gasper panel 416. The fasteners 418 can be pivoted about the pin 428 to secure the gasper panel 416 to the PSU and/or the lower ceiling 14. It will be appreciated that other suitable attachment methods may be used to secure the gasper panel 416 to the PSU and/or lower ceiling.

The gasper panel 416 can include one or more gasper nozzle features integrated into the panel 416. For example, the gasper panel 416 can include nozzles 430 with an angled output substantially similar to the nozzles 450 and a nozzle 432 substantially similar to the nozzle 350 and it will be appreciated that the above-described details are applicable herein. Each nozzle 430, 432 can include one or more outlets 434, such as three circumferentially spaced curved outlets. The outlets 434 on the nozzles 430 are angled relative to the longitudinal axis of the panel 416. Each nozzle also includes a plug 436 that may be integrally formed with the panel or secured thereto in any suitable manner. The plugs 436 include a body and outwardly extending legs that form with the panel the outlets 434. The panel 416 can also be manufactured to include other features of the gasper nozzles discussed above, such as curved flow paths, flow straighteners, etc., and any suitable number of outlet areas may be provided.

In an embodiment, the gasper panel 416 may be used with the gasper nozzles discussed above. For example, the gasper panel 416 can include openings instead of nozzles 430 and 432 for receiving one of the gasper nozzles, and the nozzles can be secured to the gasper panel 416 in a suitable manner, such as by tabs, threading, etc. The gasper panel 416 may be provided with a suitable number of openings for gasper nozzles.

Alternatively, the gasper panel 416 can include a curved projection extending downward opposite the projection 422. The projection can include openings angled outward to direct air outward as discussed above.

Figure 39:
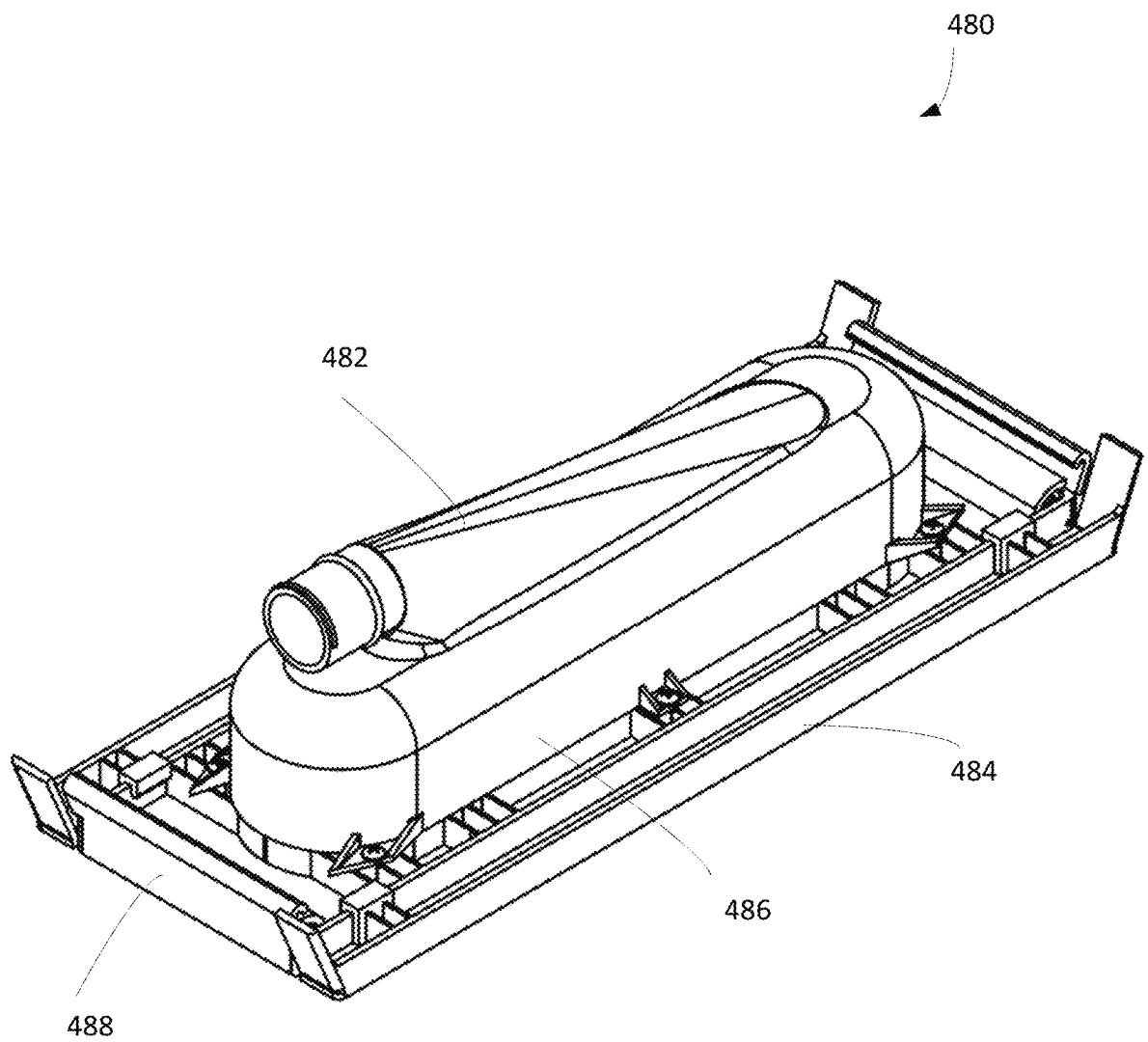
FIG. 39 is a perspective view of another exemplary airflow assembly.
Figure 40:
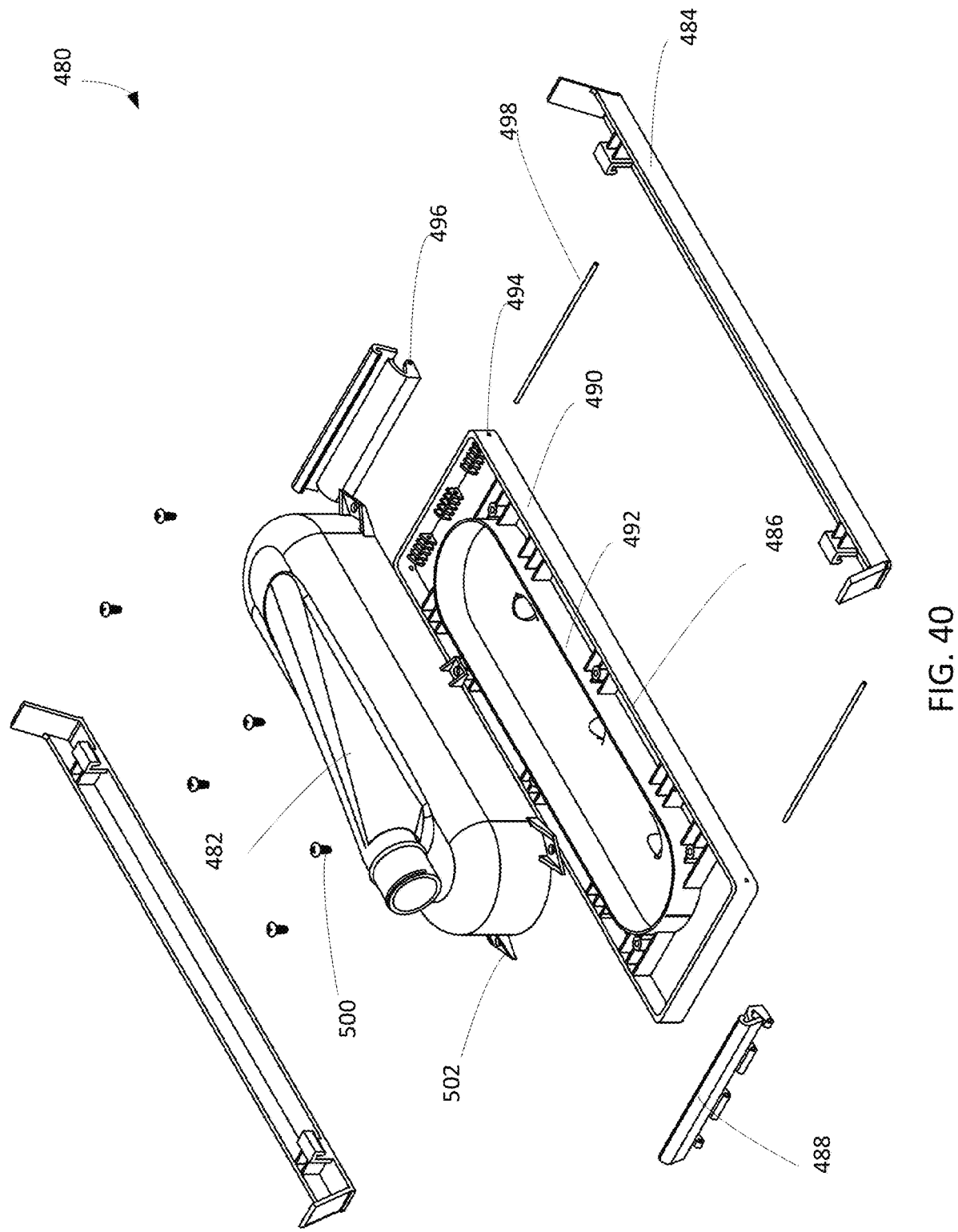
FIG. 40 is an exploded view of the airflow assembly.

Turning now to FIGS. 39 and 40, an exemplary airflow assembly is illustrated at reference numeral 480. The airflow assembly 480 is substantially the same as the above-referenced airflow assembly 410, and consequently the same reference numerals but indexed by 70 are used to denote structures corresponding to similar structures in the airflow assemblies. In addition, the foregoing description of the airflow assembly 410 is equally applicable to the airflow assembly 480 except as noted below.

The assembly 480 includes an air distributor 482 configured to be coupled to a gasper hose of the aircraft, a gasper panel 486 attached to the air distributor 482, optional spacers 484 that can be attached to the gasper panel to fill a gap in the ceiling for some aircraft, and one or more fasteners 488 for attaching the gasper panel 486 to the PSU and/or the lower ceiling 14.

The gasper panel 486 includes a base 490, a projection 492 projecting upward from the base around which the air distributor 482 is received, and a plurality of openings 484 perpendicular to the longitudinal axis of the panel 486. The air distributor 482 can be secured to the projection 492 by fasteners 500 received in openings in tabs 502 on the air distributor 482 that align with corresponding openings on the panel 486. The fasteners 488, shown as hooks, include openings 496 that align with the openings 494 to receive a pin 498 to hold the fasteners 488 to the gasper panel 486. The fasteners 488 can be pivoted about the pin 498 to secure the gasper panel 486 to the PSU and/or the lower ceiling 14. It will be appreciated that other suitable attachment methods may be used to secure the gasper panel 486 to the PSU and/or lower ceiling.

Figure 41:
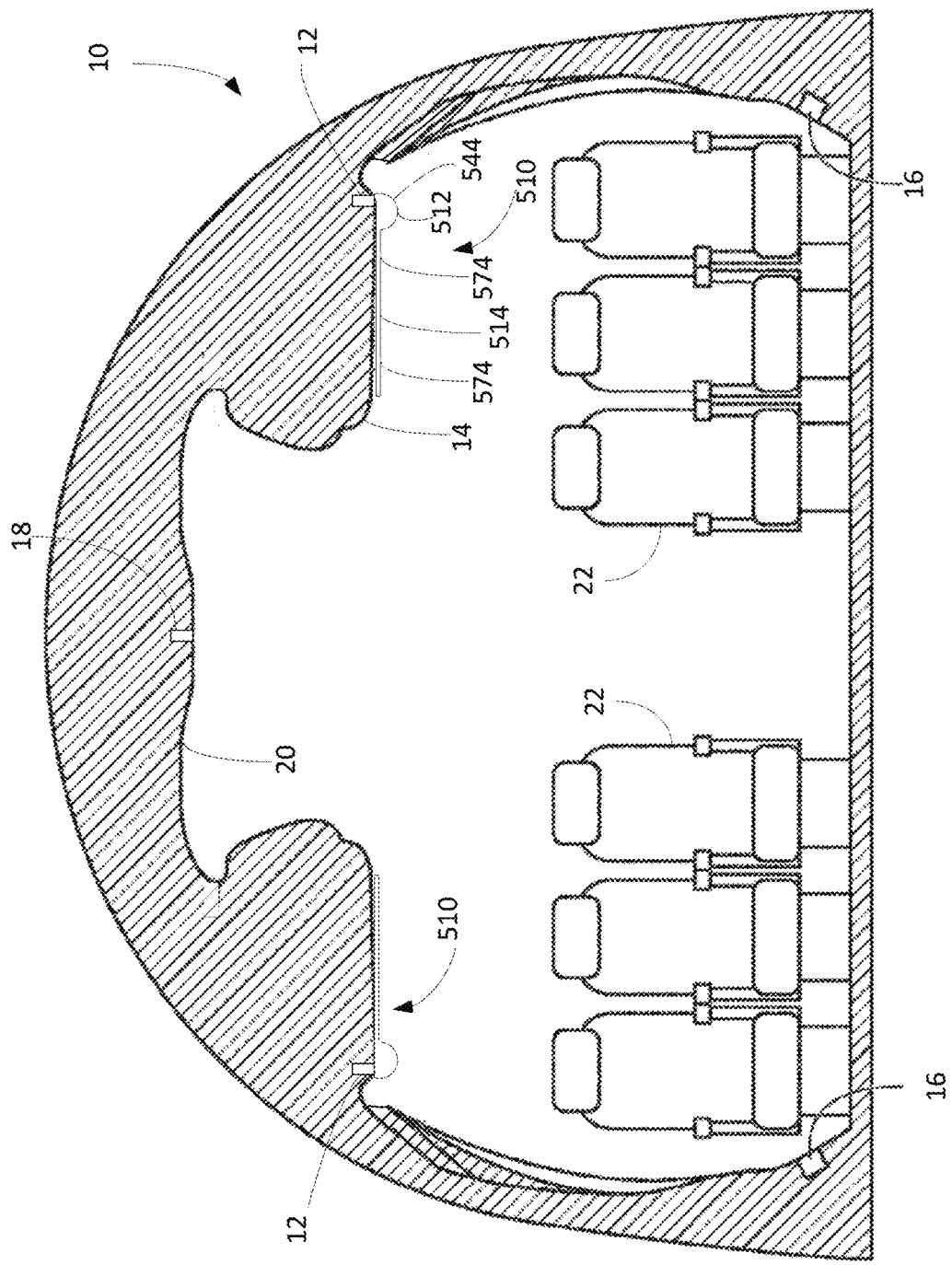
FIG. 41 is another partial cross-section of an aircraft cabin.

Turning now to FIG. 41, the exemplary aircraft cabin is shown with an air-diverter assembly 510. It will be appreciated that the air-diverter assembly 510 may be utilized alone or in combination with the above-described gasper nozzles, plates, etc. The air re-director assembly 510 can be provided for each inlet 12 extending along the length of the aircraft to direct air laterally.

Figure 42:
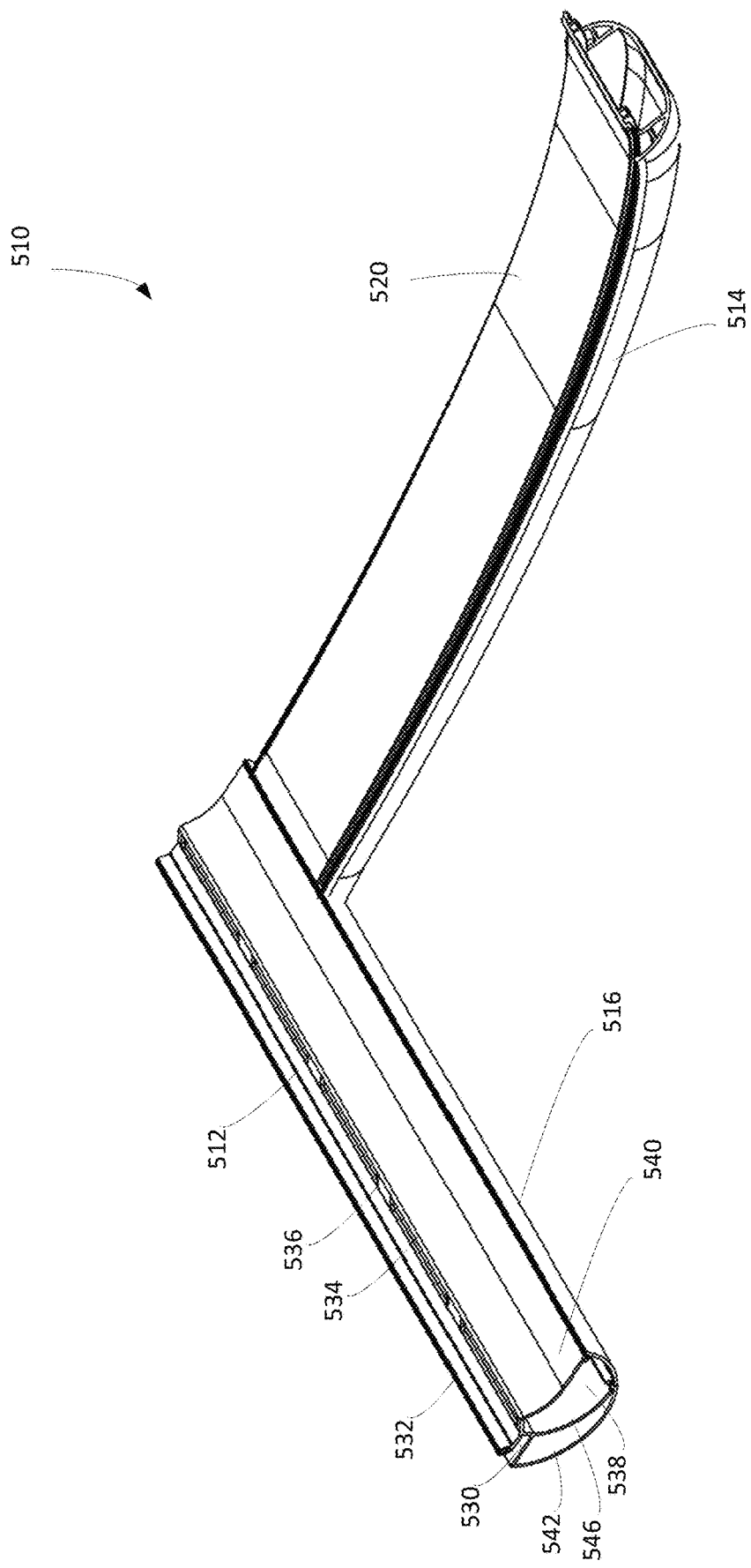
FIG. 42 is a perspective view of an exemplary air-diverter assembly.
Figure 43:
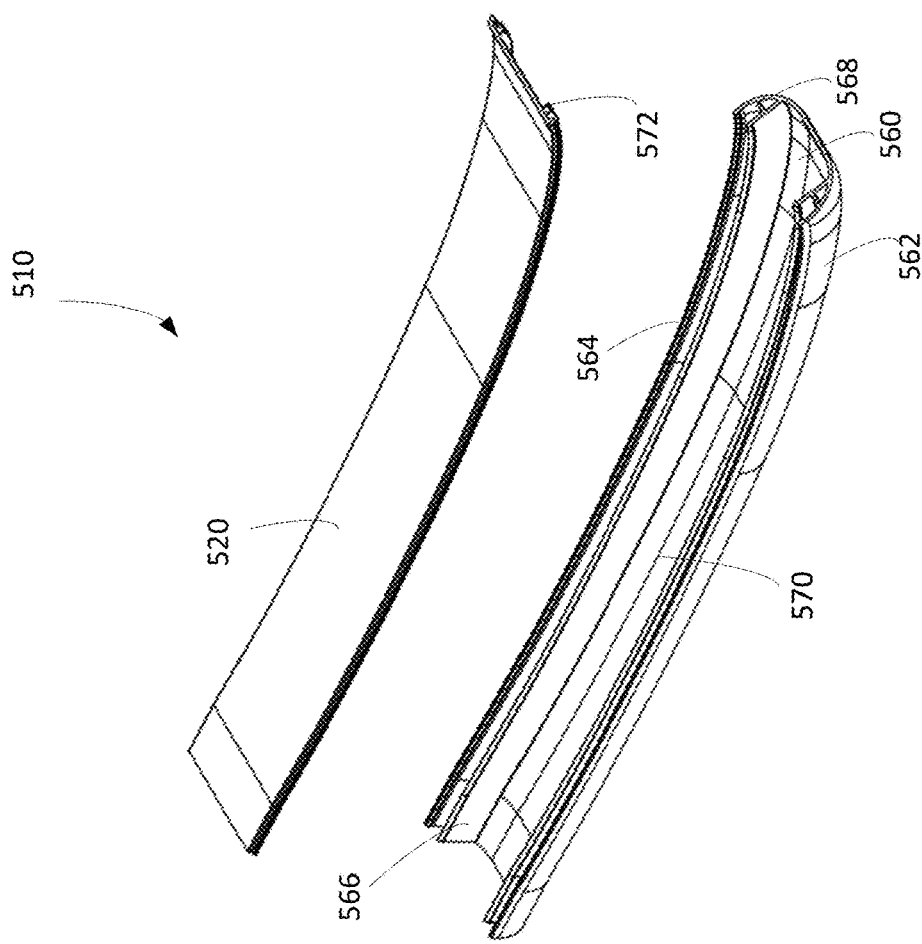
FIG. 43 is an exploded view of the air-diverter assembly.
Figure 43:
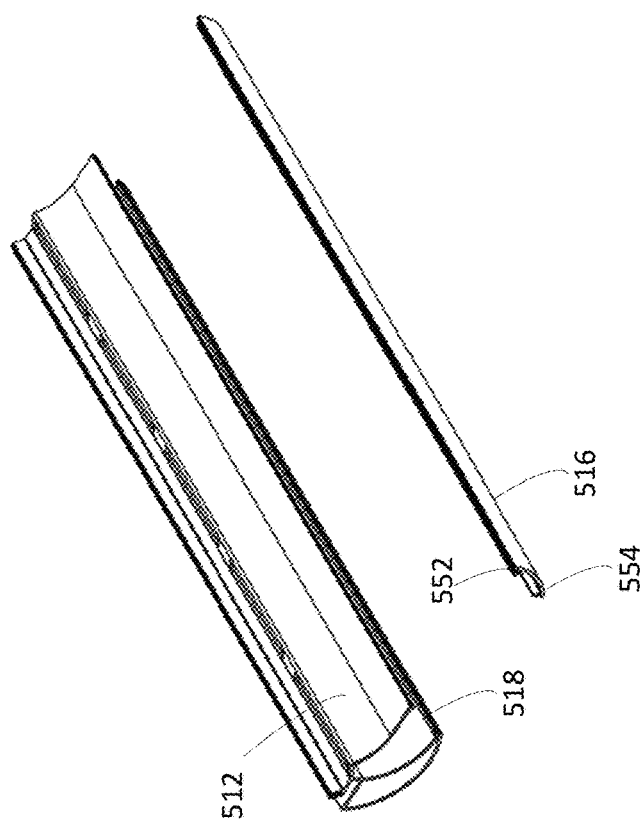
Figure 44:
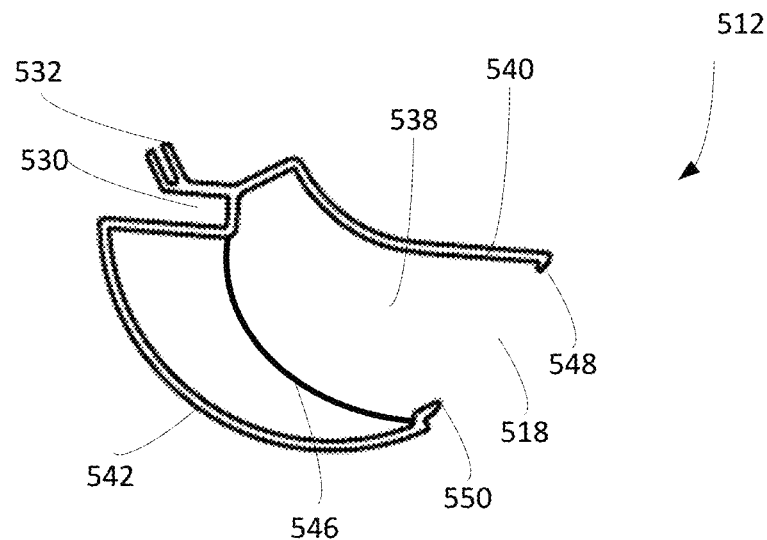
FIG. 44 is a side view of an inlet cover of the air-diverter assembly.
Figure 45:
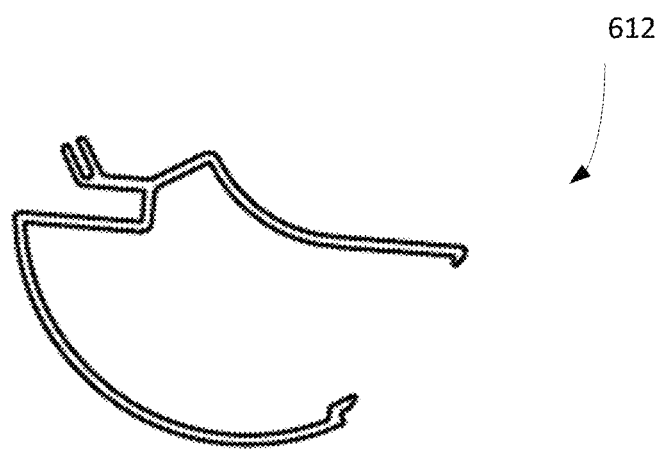
FIG. 45 is a side view of another inlet cover of the air-diverter assembly.
Figure 46:
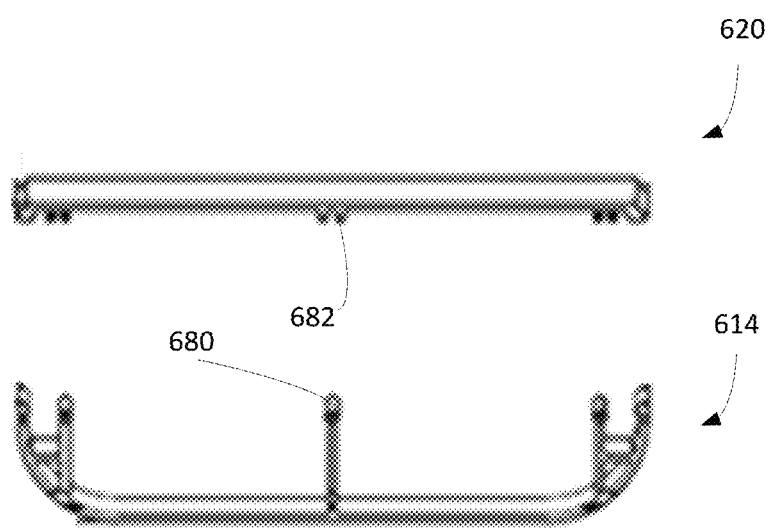
FIG. 46 is an end view of another exemplary lateral arm and lateral arm cover.
Figure 47:
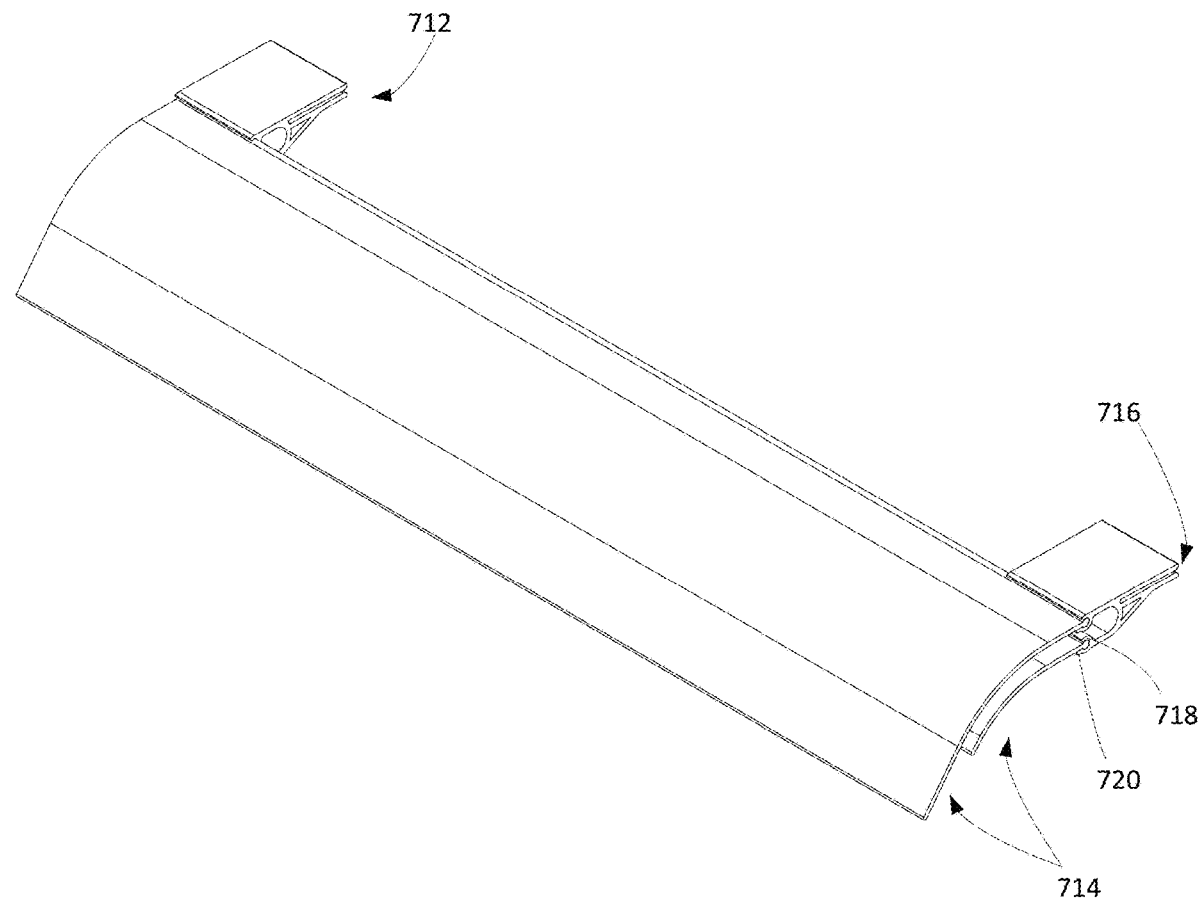
FIG. 47 is a perspective view of another exemplary air-diverter assembly.
Figure 48:
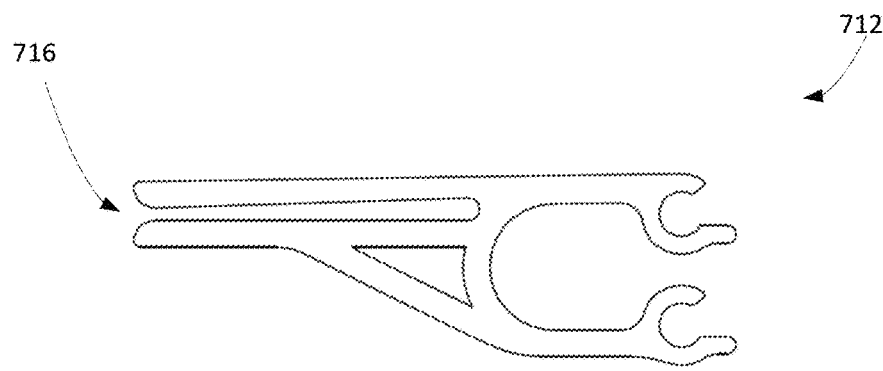
FIG. 48 is a side view of a hinge of the air-diverter assembly.
Figure 49:
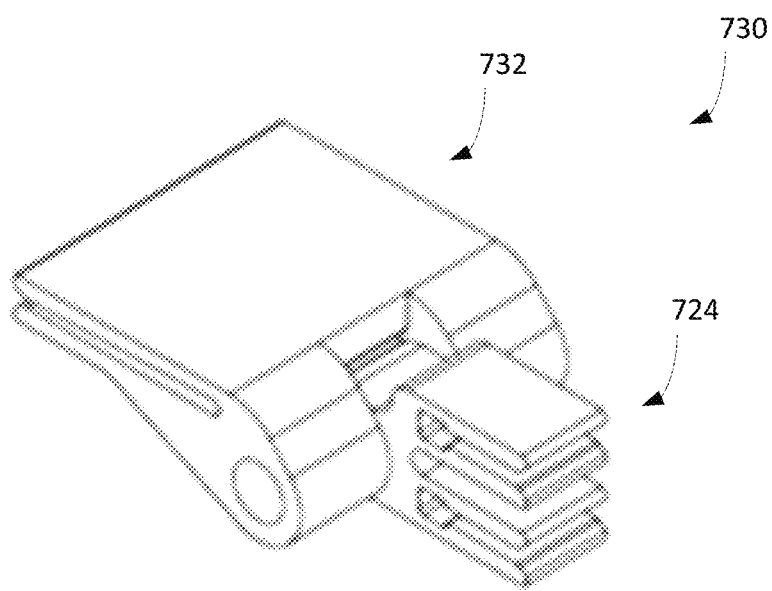
FIG. 49 is a perspective view of another exemplary hinge.

Turning additionally to FIGS. 42 and 44, the air-diverter assembly 510 can include an inlet cover 512 configured to attach to the inlet 12, one or more lateral arms 514 configured to extend laterally from the inlet cover 512 and be spaced along a length of the aircraft for example, one lateral arm 514 provided for each row of the aircraft, an inlet spacer 516 for closing a gap 518 in the inlet cover 512, and a lateral arm cover 520 attached to a top of the lateral arm 514. Suitable end caps (not shown) may be provided to close ends of the inlet cover 512 and the lateral arm 514. It will be appreciated that in an embodiment, the lateral arm 514 and lateral arm cover 520 are not utilized and the inlet spacer 516 runs the length of the gap 518. The inlet spacer 516 may be a separate component as shown or be integral with the inlet cover 512, and the inlet spacer 516 may include one or more openings for airflow to direct a portion of the air along the lower ceiling while the inlet spacer includes openings to allow airflow downward.

Figure 50:
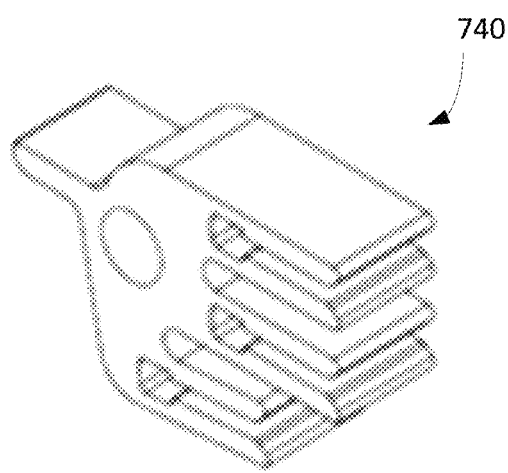
FIG. 50 is a perspective view of a second portion of another hinge.

Referring additionally to FIG. 44, the inlet cover 512 includes a gap 530 formed between walls that fits into a portion of the aircraft and a hook 532 that mates with a diffuser inside the inlet 12. It will be appreciated that other suitable methods of attaching the inlet cover 512 to the aircraft may be used, and a suitable seal, gasket, or the like may be used to provide a seal to the diffuser. The airflow passes between the hook 532 and a lip 534 and through one or more openings 536, and as illustrated a plurality of longitudinally spaced openings, into a cavity 538 in the inlet cover 512 defined between legs 540 and 542. The inlet cover 512 also includes one or more openings, and as illustrated in FIG. 41 a plurality of openings 544 in the leg 542, that direct airflow in the cavity 538 downward near a sidewall of the aircraft to direct aerosol to the outlets 16 and minimize recirculation of air not immediately filtered out of the cabin. The plurality of openings 544 may extend along the length of the inlet cover 512 and may be provided in any suitable arrangement, for example, and may be segmented according to passenger rows.

The inlet cover 512 may also include a support 546 extending along a length of the cover that includes openings, for example openings corresponding to the openings 544 to allow air in the cavity 518 to flow through the openings in the support 546 to the openings 544. The inlet cover 512 can also include hooks 548 and 550 on the legs 540 and 542 respectively to mate with the lateral arm 514 and arm cover 520 and respective hooks 552 and 554 of the inlet spacer 516. It will be appreciated that the inlet spacer 516 may be attached in other suitable ways. FIG. 45 illustrates an embodiment of an inlet cover 612 that is substantially the same as the inlet cover 512 except the embodiment does not include the support 546.

Turning now to the lateral arm in detail, the lateral arm 514 includes a base 560 and sides 562 and 564 extending from the base 560 to define a substantially u-shaped profile. Projecting upward from the base 560 and inwardly spaced from the sides 562 and 564 are supports 566 that define with the sides 562 and 564 respective gaps 568 that are sealed off from airflow when the arm cover 520 is attached and a cavity 570 for airflow is formed. The supports 566 can be provided to support the base 560, for example when heat formed to match a curvature of the ceiling. The base 560 can also include one or more openings 574, such as a plurality of spaced openings as shown in FIG. 41, for example, or one or more sets of openings including a suitable number of openings each. The openings can be optimized to create continuous air distribution or clustered for more directional flow. The openings can push air out of the cabin more quickly, reducing cross-contamination.

Turning now to the lateral arm cover 520, the lateral arm cover 520 includes pairs of projections 572 extending downward to receive therebetween a respective one of the supports 566. The lateral arm cover may be similarly heat formed as the base 560 to correspond in shape to the base. The lateral arm cover 520 can be attached to the ceiling in a suitable manner, such as by adhesive, fasteners, etc.

During assembly, the lateral arm cover 520 is fit snuggly to the leg 540 of the inlet cover 512, the inlet spacer 516 is slid into the inlet cover 512 and pushed up tightly against the lateral arm cover 520 to form a seal, and the legs 540 and 542 mate to the supports 566 of the lateral arm 514. The seal extends to the legs 540 and 542 of the inlet cover 512 so that air only passes from the cavity 538 through the cavity 570 of the lateral arm 514. The end cap may be attached to the end of the lateral arm at any suitable time during assembly, and the end may include one or more openings to allow airflow toward the aisle. The lateral arm may extend fully along the ceiling or partially along the ceiling.

In an embodiment, the lateral arm cover 520 may be designed with one or more openings to allow gasper nozzles, the PSU or gasper panel to extend through the cover 520. The lateral arm may also incorporate any of the above-described nozzle designs. In another embodiment, the assembly 510 may be designed to extend up to or be spaced from the PSU. It will be appreciated that the assembly 510 may be utilized with the above-described gasper nozzles and assemblies to provide additional airflow modification to the cabin that may be independent from the gaspers.

Turning now to FIG. 46, illustrated is an embodiment of a lateral arm 614 and lateral arm cover 620 that is substantially the same as the lateral arm 514 and lateral arm cover 620 except the lateral arm 614 includes a center support 680 and the lateral arm cover 620 includes projections 682 extending downward to receive therebetween the center support 680. The center support 680 can be used to support the assembly when the width of the lateral arm 614 is increased relative to the width of the lateral arm 514. The center support 680 also serves to divide the cavity 570 to allow for even flow distribution through openings on either side of the support.

Turning now to FIGS. 47 and 48, an exemplary air-diverter assembly is illustrated at reference numeral 710. The air-diverter assembly 710 can be installed above the luggage bins to redirect at least a portion of the air from inlets above the luggage bins down along the luggage bins to reposition a point of intersection of symmetrical airflow from both sides of the cabin to assist in the downward circular flow pattern. The air-diverter assembly may also be installed in the sidewall of the aircraft. The air-diverter assembly 710 includes one or more hinges 712 attached to one or more air-diverter flaps 714. The hinges 712 allow the air-diverter flaps 714 to rotate upward during movement of the luggage bins to provide clearance between the luggage bins and air-diverter flaps 714 and to rotate back down when the luggage bins are closed. The hinges 712 include an attachment portion 716 that attaches to a horizontal bar above the bins, a pivot portion 718 that receives a portion of the air-diverter flaps 714 to allow them to pivot, and a leg 720 that abuts an underside of the air-diverter flaps 714 to serve as a stop to prevent the redirector flaps from contacting one another. The flaps 714 may each receive a portion of the airflow and redirect the flow downward.

Turning now to FIG. 49, another exemplary hinge substantially similar to the hinge 712 is shown at reference numeral 730. The hinge 730 includes a first portion 732 for attachment to the aircraft and a second portion 734 for attachment to the air-diverter flaps. The second portion 734 can be pivotally attached to the first portion to allow movement of the flaps during movement of the bins. FIG. 50 shows another exemplary second portion at reference numeral 740 that is substantially similar to the second portion 734.

Figure 51:
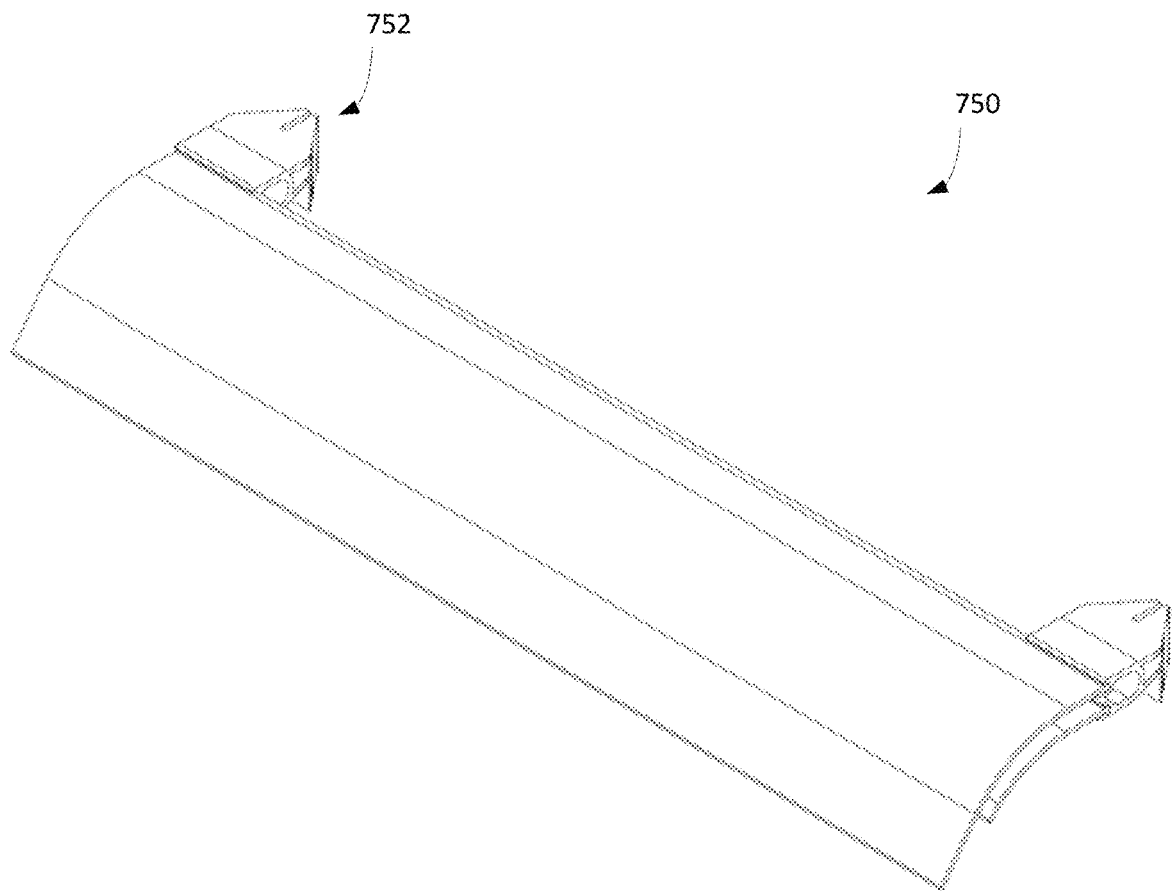
FIG. 51 is a perspective view of another exemplary air-diverter assembly.
Figure 52:
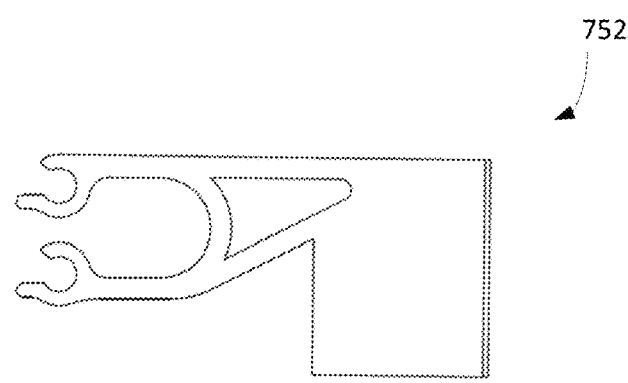
FIG. 52 is a side view of a hinge of the air-diverter assembly.
Figure 53:
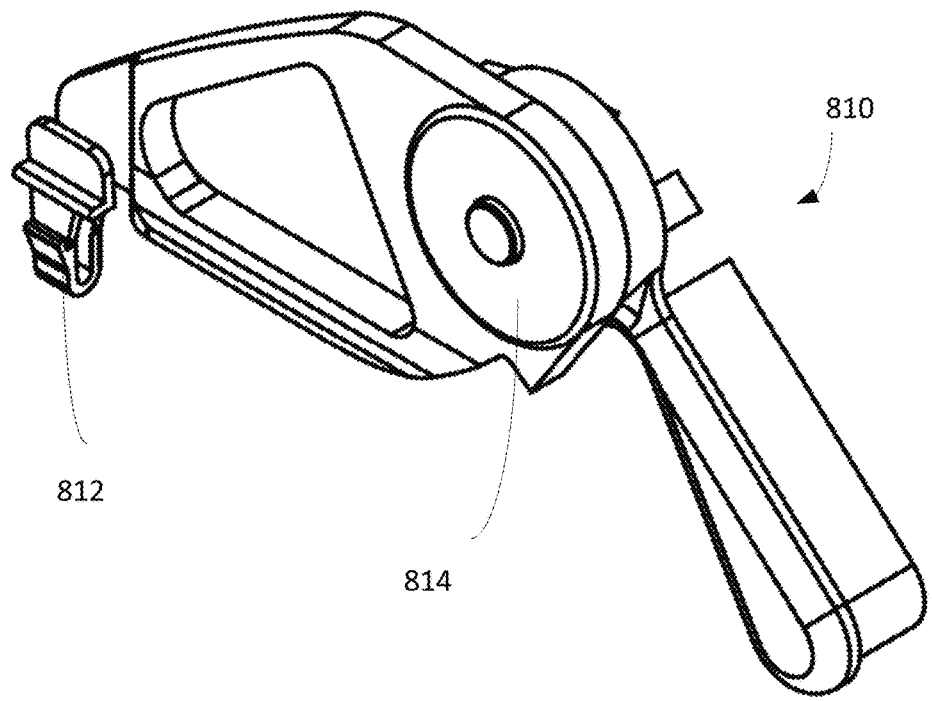
FIG. 53 is a perspective view of an exemplary air-diverter mount.
Figure 54:
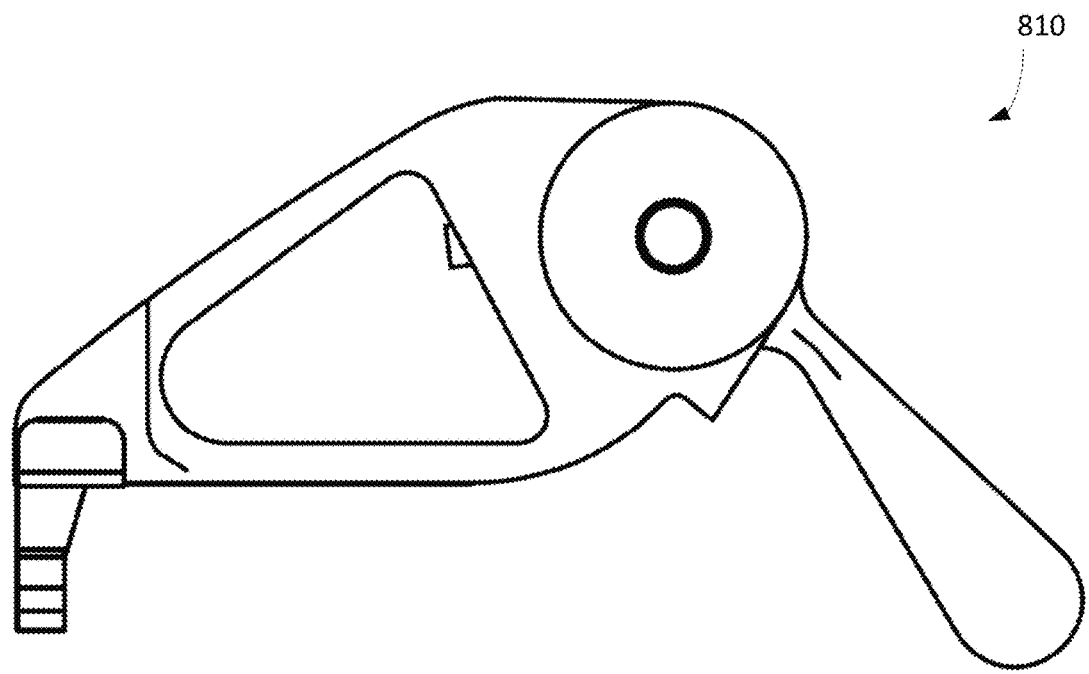
FIG. 54 is a side view of the air-diverter mount.
Figure 55:
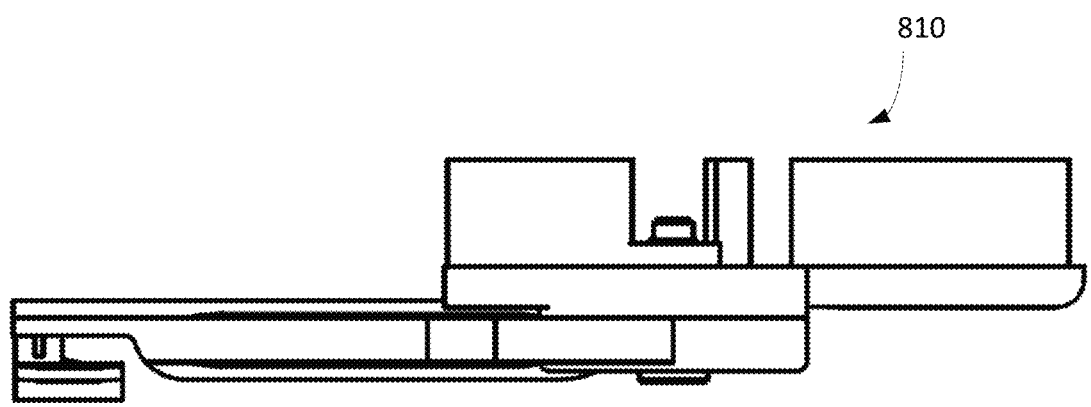
FIG. 55 is a top view of the air-diverter mount.
Figure 56:
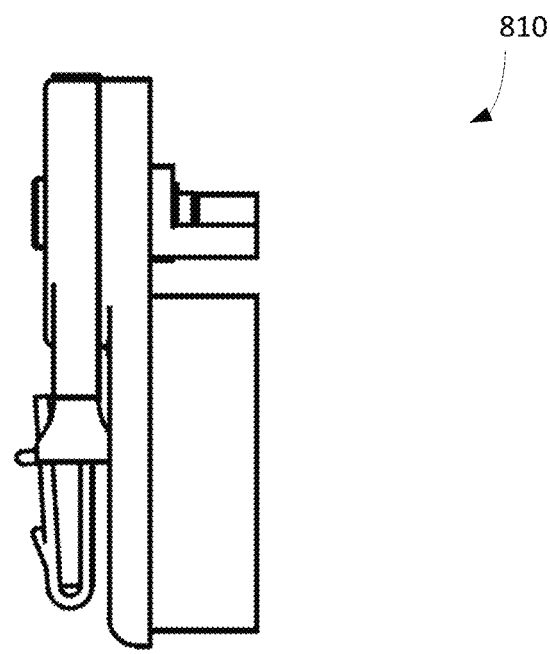
FIG. 56 is an end view of the air-diverter mount.

Turning not to FIGS. 51 and 52, another exemplary air-diverter assembly substantially similar to air-diverter assembly 710 is illustrated at reference numeral 750. The air-diverter assembly includes a hinge 752 that allows for vertical attachment of the hinge to the aircraft, for example at an air grate.

Turning now to FIGS. 53-56, an exemplary adjustable air-diverter mount is illustrated at reference numeral 810. The air-diverter mount may be used with an oppositely oriented mount to hold an air-diverter therebetween to control the air from the side air inlets. The air-diverter mount 810 may be attached to the aircraft by one or more clips 812 that can attach to a grate in the sidewall, and can be adjustable at pivot 814 to adjust the angle of airflow from the sidewall.

In the aircraft cabin, the air supplied by the ventilation system creates a turbulent zone of mixing air that causes exhaled aerosol droplets from various passengers to become trapped, passing through passenger breathing zones multiple times before exiting the cabin through the air outlets. The above embodiments reduce the amount of potentially contaminated aerosol that passes through passenger breathing zones. To address public health challenges and the long-term socioeconomic effects of infectious diseases such as SARS, Swine Flu, Ebola, and COVID-19, the above embodiments exploit existing aircraft systems to minimize exposure and aid in the control of airborne diseases.

Additionally, the above embodiments minimize the recirculation of aerosol droplets by increasing the rate at which particles are purged from the cabin. As a result, the overall concentration of aerosol droplets shared between passengers' breathing zones is reduced.

It will be appreciated that the above embodiments could be used in combination with one another where practicable and that elements of the above embodiments may be combined to provide desired results.

Although certain embodiments have been shown and described, it is understood that equivalents and modifications falling within the scope of the appended claims will occur to others who are skilled in the art upon the reading and understanding of this specification.

What is claimed is:

1. A nozzle assembly including a plurality of nozzles configured to be positioned in and coupled to a plate in a cabin of an aircraft above a passenger, the plurality of nozzles including:

a first nozzle in a fixed position having an outlet angled in a first outward direction;

a second nozzle in a fixed position having an outlet angled in a second outward direction opposite the first outward direction; and a third nozzle in a fixed position positioned between the first and second nozzles, the third nozzle having an outlet angled in a third direction between the first and second outward directions, wherein each of the first, second, and third nozzles includes a body having a longitudinal axis perpendicular to a longitudinal axis of the plate and including a cylindrical portion, a head portion extending downward from the cylindrical portion, and one or more arms projecting upward from the cylindrical portion, each of the one or more arms having at least one tab for engaging in the plate, wherein an end of the cylindrical portion defines an inlet configured to be connected to a source of air, wherein a flow passage in communication with the inlet extends through the body, and wherein the outlet is in communication with the flow passage and located in the head portion angled relative to the longitudinal axis.

2. A gasper assembly including:

an air distributor configured to be coupled to a gasper hose;

a gasper panel attached to the air distributor;

one or more fasteners attached to the gasper panel for attaching the gasper panel to a passenger service unit; and a nozzle assembly according to claim 1.

3. The nozzle assembly according to claim 1, wherein the one or more arms includes a pair of arms projecting upward from the cylindrical portion.

4. The nozzle assembly according to claim 1, wherein the head portion is a curved portion extending from the cylindrical portion downward for optimizing downward directional airflow.

5. The nozzle assembly according to claim 1, wherein the nozzle is configured to be positioned in the plate such that the longitudinal direction is perpendicular to a longitudinal axis of the plate.

6. The gasper assembly according to claim 2, further including spacers attached to the gasper panel to fill a gap in a ceiling of the aircraft.

7. A gasper assembly including:

an air distributor configured to be coupled to a gasper hose; and a gasper panel attached to the air distributor, the gasper panel including a plurality of nozzles, each nozzle including one or more outlets, wherein at least one nozzle has a respective one of the one or more outlets angled outward in a fixed position relative to a vertical axis of the gasper panel, and at least one nozzle has a respective one of the one or more outlets extending parallel to the axis in a fixed position, and wherein the plurality of nozzles are aligned with one another along a longitudinal axis of the gasper panel.

8. The gasper assembly according to claim 7, wherein each of the nozzles includes a plug having a body and outwardly extending legs that form with the panel circumferentially spaced outlets.

9. The gasper assembly according to claim 7, further comprising one or more fasteners attached to the gasper panel for attaching the gasper panel to a passenger service unit.

10. The gasper assembly according to claim 7, wherein the at least one nozzle having a respective one of the one or more outlets angled outward in the fixed position relative to the axis of the gasper panel includes a first nozzle having the respective one of the one or more outlets angled outward in a first outward direction in the fixed position relative to the axis of the gasper panel, and a second nozzle having the respective one of the one or more outlets angled outward in a second outward direction opposite the first outward direction in the fixed position relative to the axis of the gasper panel.

* * * * *